United States Patent
Nomiyama et al.

(10) Patent No.: US 10,985,654 B2
(45) Date of Patent: Apr. 20, 2021

(54) SWITCHING REGULATOR AND METHOD OF OPERATING THE SAME

(71) Applicant: Samsung Electronics Co., Ltd., Suwon-si (KR)

(72) Inventors: Takahiro Nomiyama, Seoul (KR); Seung-chan Park, Incheon (KR); Jong-beom Baek, Yangju-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/574,614

(22) Filed: Sep. 18, 2019

(65) Prior Publication Data
US 2020/0295655 A1    Sep. 17, 2020

(30) Foreign Application Priority Data
Mar. 11, 2019  (KR) .......................... 10-2019-0027642

(51) Int. Cl.
*H02M 3/07*    (2006.01)

(52) U.S. Cl.
CPC ...... *H02M 3/073* (2013.01); *H02M 2003/077* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 2003/1566; H02M 2003/1557; H02M 2001/0012; H02M 2001/0009; H02M 2001/385; H02M 7/06; H02M 7/10; H02M 7/19; H02M 7/25; H02M 3/07; G11C 5/145

USPC .................................................. 323/280–285
See application file for complete search history.

(56) References Cited

U.S. PATENT DOCUMENTS

| | | |
|---|---|---|
| 5,508,903 A | 4/1996 | Alexndrov |
| 6,211,657 B1 | 4/2001 | Goluszek |
| 6,215,290 B1 | 4/2001 | Yang et al. |
| 6,798,177 B1 | 9/2004 | Liu et al. |
| 8,363,434 B2 | 1/2013 | Lin |
| 9,729,054 B2 | 8/2017 | Ernest et al. |

(Continued)

FOREIGN PATENT DOCUMENTS

| | | |
|---|---|---|
| KR | 10-2006-0082570 A | 7/2006 |
| WO | WO-2017-205098 A1 | 11/2017 |

OTHER PUBLICATIONS

European Search Report for corresponding European Application No. 19203158.1 dated Apr. 9, 2020.

*Primary Examiner* — Bryan R Perez
(74) *Attorney, Agent, or Firm* — Harness, Dickey & Pierce, P.L.C.

(57) ABSTRACT

A switching regulator configured to generate a level-controlled output voltage from an input voltage, the switching regulator includes an inductor, an output capacitor configured to generate the level-controlled output voltage based on a current flowing through the inductor, at least two flying capacitors, and a plurality of switches configured to form electrical connections when the switching regulator operates in a first operating mode to, alternately charge each of the at least two flying capacitors using the input voltage, and provide a first boosted voltage to the inductor using a charged flying capacitor among the at least two flying capacitors.

20 Claims, 31 Drawing Sheets

(56) References Cited

U.S. PATENT DOCUMENTS

| | | |
|---|---|---|
| 9,742,279 B2 | 8/2017 | Lin et al. |
| 2003/0090252 A1 | 5/2003 | Hazucha |
| 2006/0164050 A1* | 7/2006 | Hasegawa ............ H02M 3/1584 |
| | | 323/272 |
| 2014/0184189 A1* | 7/2014 | Salem ................... H02M 3/158 |
| | | 323/299 |
| 2014/0266134 A1* | 9/2014 | Zhak ....................... H02M 1/36 |
| | | 323/311 |
| 2017/0155324 A1 | 6/2017 | Choquet |
| 2017/0201177 A1* | 7/2017 | Kesarwani ............ H02M 3/158 |
| 2019/0020273 A1 | 1/2019 | Hsu |
| 2019/0252974 A1* | 8/2019 | Meyvaert ................ H02M 3/07 |
| 2019/0356285 A1 | 11/2019 | Khlat et al. |
| 2020/0059159 A1 | 2/2020 | Petersen |

\* cited by examiner

FIG. 12

| V_O TARGET | $V_O < V_{IN}(1-a)$ | $V_{IN}(1-a) \leq V_O < V_{IN}(1+a)$ | $V_{IN}(1+a) \leq V_O < V_{IN}(1+b)$ | $V_{IN}(1+b) \leq V_O$ |
|---|---|---|---|---|
| OPERATING MODE | BUCK | BUCK-BOOST | 1st BOOST(SYNCHRONOUS) | 2nd BOOST(INTERLEAVING) | e.g.) a=0.1, b=0.5

SWITCHING REGULATOR AND METHOD OF OPERATING THE SAME

CROSS-REFERENCE TO RELATED APPLICATION

This application claims the benefit of Korean Patent Application No. 10-2019-0027642, filed on Mar. 11, 2019, in the Korean Intellectual Property Office, the disclosure of which is incorporated herein in its entirety by reference.

BACKGROUND

The inventive concepts relate to generation of a supply voltage, and more particularly, to a switching regulator and a method of operating the same.

A supply voltage may be generated to provide electric power to electronic components, and the level of the supply voltage provided to an electronic component may be changed to reduce power consumption of the electronic component. For example, in the case of digital circuits that process digital signals, a low-level supply voltage may be provided when relatively low performance is expected while a high-level supply voltage may be provided when relatively high performance is expected. Accordingly, a switching regulator that generates a supply voltage at various levels may be used, and the switching regulator may quickly change a voltage level and generate a supply voltage having reduced noise in a limited design space. Therefore, there has been research into realizing a compact switching regulator that efficiently generates a supply voltage at various levels.

SUMMARY

The inventive concepts provide a switching regulator for increasing the reliability and efficiency of a voltage converting operation for generation of an output voltage and a method of operating the switching regulator.

According to an aspect of the inventive concepts, there is provided a switching regulator configured to generate a level-controlled output voltage from an input voltage. The switching regulator includes an inductor, an output capacitor configured to generate the level-controlled output voltage based on a current flowing through the inductor, at least two flying capacitors, and a plurality of switches configured to form electrical connections when the switching regulator operates in a first operating mode to, alternately charge each of the at least two flying capacitors using the input voltage, and provide a first boosted voltage to the inductor using a charged flying capacitor among the at least two flying capacitors.

According to an aspect of the inventive concepts, there is provided a switching regulator configured to generate a level-controlled output voltage from an input voltage. The switching regulator includes an inductor, an output capacitor configured to generate the level-controlled output voltage based on a current flowing through the inductor, a first flying capacitor configured to provide a first boosted voltage to the inductor, a second flying capacitor configured to provide a second boosted voltage to the inductor, a first switch circuit connected to the first flying capacitor and configured to form electrical connections to, connect the first flying capacitor to the inductor when the switching regulator operates in a first phase of a first operating mode, the first operating mode being based on an interleaving switch control scheme, and charge the first flying capacitor with the input voltage when the switching regulator operates in a second phase of the first operating mode, and a second switch circuit connected to the second flying capacitor and configured to form electrical connections to, charge the second flying capacitor with the input voltage when the switching regulator operates in the first phase of the first operating mode, and connect the second flying capacitor to the inductor when the switching regulator operates in the second phase of the first operating mode.

According to an aspect of the inventive concepts, there is provided a switching regulator configured to generate an output voltage from an input voltage. The switching regulator includes an inductor an output capacitor configured to generate the output voltage based on a current flowing through the inductor, a plurality of first flying capacitors, and a first switch circuit configured to provide a first boosted voltage boosted from the input voltage to the inductor in one of a buck-boost mode or a boost mode by forming electrical connections to, charge each of the plurality of first flying capacitors with the input voltage in a first phase, and connect the plurality of first flying capacitors to the inductor in series in a second phase.

BRIEF DESCRIPTION OF THE DRAWINGS

Some example embodiments will be more clearly understood from the following detailed description taken in conjunction with the accompanying drawings in which:

FIG. 12 is a table of conditions for setting an operating mode of a switching regulator, according to an example embodiment;

DETAILED DESCRIPTION

In the present specification, turning on of a switch may refer to a state in which both ends of the switch are electrically connected to each other and turning off of the switch may refer to a state in which both ends of the switch are electrically disconnected from each other. In addition, at least two elements electrically connected to each other via a switch in an on-state and/or a conducting wire may be referred to as being simply "connected", and at least two elements electrically connected via a conducting wire or the like all the time may be referred to as being "coupled".

Hereinafter, embodiments will be described in detail with reference to the attached drawings.

Figure 1:
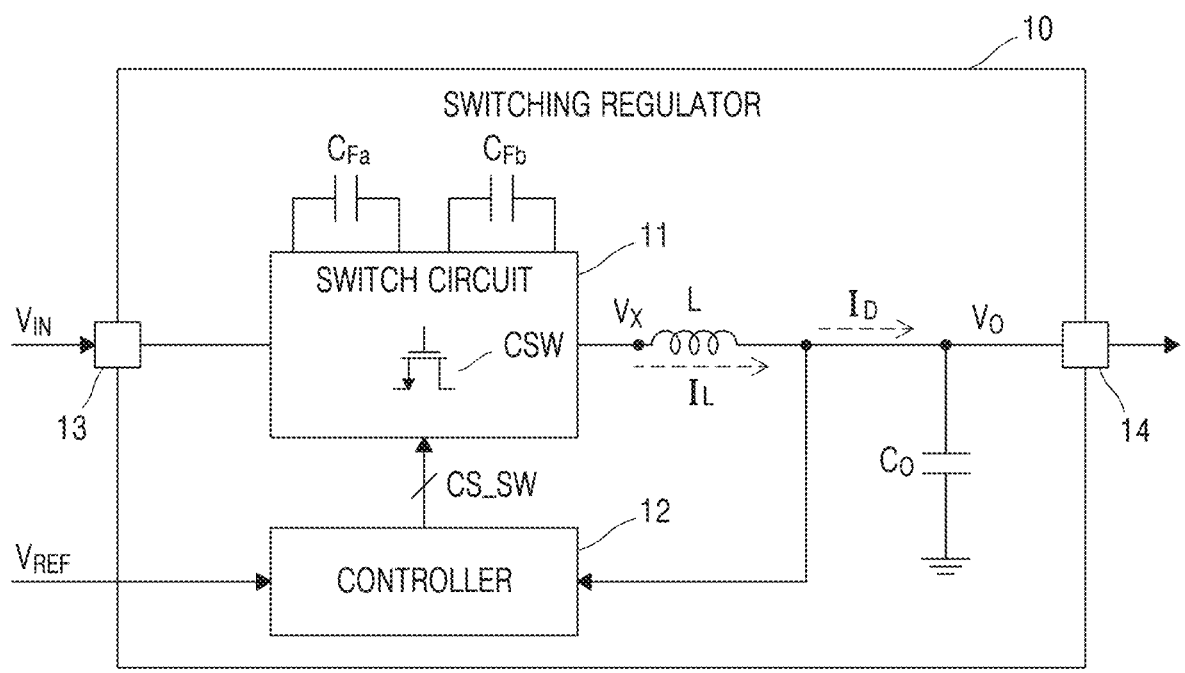
FIG. 1 is a block diagram of a switching regulator according to an example embodiment.

FIG. 1 is a block diagram of a switching regulator 10 according to an example embodiment. The switching regulator 10 may receive an input voltage VIN through an input node 13 and output an output voltage VO through an output node 14. The output voltage VO may be used as a supply voltage for other electronic components (and/or loads).

As shown in FIG. 1, the switching regulator 10 may include a switch circuit 11, a controller 12, a plurality of flying capacitors, e.g., first and second flying capacitors CFa and CFb, an inductor L, and/or an output capacitor CO. In some embodiments, elements of the switching regulator 10 may be included in a single semiconductor package. In some embodiments, the switching regulator 10 may include a printed circuit board (PCB), and at least two elements of the switching regulator 10 may be mounted on the PCB as separate semiconductor packages. According to some example embodiments, operations described herein as being performed by the controller 12 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. According to some example embodiments, operations described herein as being performed by the switching regulator 10 may be performed based on control signals generated by the controller 12.

The switching regulator 10 may refer to an electronic circuit configured to generate the output voltage VO by switching on or off an element. For example, the switch circuit 11 of the switching regulator 10 may turn on or off at least one switch included in the switch circuit 11 based on a switching control signal CS_SW from the controller 12, and accordingly, a path of an inductor current IL flowing through the inductor L may be controlled. Through the operation of the switch circuit 11, the switching regulator 10 may operate as various converters, which will be described below.

As an example of the switching regulator 10, a direct current (DC)-DC converter may generate a DC voltage, e.g., the output voltage VO, from a DC voltage, e.g., the input voltage VIN. For example, a buck converter may generate the output voltage VO at a lower level than the input voltage VIN and may be referred to as a step-down converter. A boost converter may generate the output voltage VO at a higher level than the input voltage VIN and may be referred to as a step-up converter. Furthermore, the boost converter may operate in multiple boost modes. For example, the boost converter may operate in a boost mode, in which the ratio between the level of the input voltage VIN and the level of the output voltage VO is equal to or lower than a reference value, or a boost mode, in which the ratio between the level of the input voltage VIN and the level of the output voltage VO exceeds the reference value. A buck-boost (or a step-up/down) converter may generate the output voltage VO at a lower or higher level than the input voltage VIN. Hereinafter, the switching regulator 10 will be described mainly referring to a buck-boost DC-DC converter which generates an output voltage in various operating modes, but it will be understood that example embodiments may be applied to a different type of the switching regulator 10, such as an alternating current (AC)-DC converter, in which the input voltage VIN is an AC voltage. According to some example embodiments, the reference value may be a design parameter determined through empirical study.

In some embodiments, the switching regulator 10 may be set in one of a buck mode, a buck-boost mode, and/or multiple boost modes according to a target level of the output voltage VO. For example, the controller 12 may set the mode of the switching regulator 10 based on the input voltage VIN and a reference voltage VREF. In some embodiments, the controller 12 may set the switching regulator 10 in the buck mode when the level of the output voltage VO is lower than about 90% of the input voltage VIN, in a first boost mode (or a normal boost mode) when the level of the output voltage VO is equal to or higher than about 110% of the input voltage VIN and lower than about 150% of the input voltage VIN, in a second boost mode (or an extended boost mode) when the level of the output voltage VO is equal to or higher than about 150% of the input voltage VIN, and in the buck-boost mode when the level of the output voltage VO is equal to or higher than about 90% of the input voltage VIN and lower than about 110% of the input voltage VIN. Since the switching regulator 10 supports all of the buck mode, the buck-boost mode, and the boost modes, the level of the output voltage VO may vary in a wide range. According to some example embodiments, the reference voltage VREF may be a design parameter determined through empirical study.

The switch circuit 11 may include a connecting switch CSW. Although the connecting switch CSW is implemented as an N-channel metal-oxide semiconductor (NMOS) transistor in an embodiment shown in the drawings including FIG. 1, this is just an example embodiment, and the inventive concepts are not limited thereto. The connecting switch CSW may be implemented as various semiconductor elements. Hereinafter, the connecting switch CSW is a semiconductor element that may selectively connect an end of each of the first and second flying capacitors CFa and CFb to the input node 13. An output terminal of the connecting switch CSW may branch off to at least two current paths. For example, the current paths may include a path of a current that charges each of the first and second flying capacitors CFa and CFb and a path of the inductor current IL toward the inductor L. Although only one connecting switch CSW is illustrated in FIG. 1 for convenience of description, the switch circuit 11 may include more connecting switches according to some example embodiments. According to some example embodiments, an appropriate switch control scheme may be applied to the switch circuit 11 in a certain operating mode to prevent or reduce excessive current flow in the connecting switch CSW. According to some example embodiments, an appropriate circuit configuration may be applied to the switch circuit 11 in the certain operating mode to prevent or reduce excessive current flow in the connecting switch CSW.

According to an example embodiment, the switch circuit 11 may be controlled using different switch control schemes according to operating modes of the switching regulator 10, and therefore, current flowing in the connecting switch CSW may be prevented from exceeding a predetermined or determined level, or the occurrence of the current flowing in the connecting switch CSW exceeding he predetermined or determined level may be reduced, regardless of the operating mode (or the level of the output voltage VO) of the switching regulator 10. In other words, a current load on the connecting switch CSW is reduced, miniaturization of the connecting switch CSW may be realized, a design advantage of the switching regulator 10 may be brought, and the switching regulator 10 may perform a reliable and efficient voltage converting operation even at a high switching frequency, thereby broadening the level spectrum of the output voltage VO.

According to some embodiments, when a target level of the output voltage VO is equal to or higher than a reference level (e.g., a reference voltage level), the switch circuit 11 may be controlled by the controller 12 using a first switching control scheme in a corresponding operating mode. For example, when the target level of the output voltage VO is equal to or higher than the reference level, the controller 12 may set the switching regulator 10 in the second boost mode and may provide the switching control signal CS_SW, which is generated based on the first switch control scheme, to the switch circuit 11 to generate the output voltage VO at the target level. The switch circuit 11 may perform a switching operation based on the switching control signal CS_SW and may be controlled to output a current through one of a plurality of paths, which pass through the connecting switch CSW, in some phases of a switching cycle. For example, the paths may include a path toward each of the first and second flying capacitors CFa and CFb and a path toward the inductor L. According to some example embodiments, the reference level may be a design parameter determined through empirical study.

According to some embodiments, when the target level of the output voltage VO is lower than the reference level, the switch circuit 11 may be controlled by the controller 12 using a second switching control scheme in a corresponding operating mode. For example, when the target level of the output voltage VO is lower than the reference level, the controller 12 may set the switching regulator 10 in the buck mode, the buck-boost mode, or the first boost mode according to the target level and may provide the switching control signal CS_SW, which is generated based on the second switch control scheme, to the switch circuit 11 to generate the output voltage VO at the target level. The switch circuit 11 may perform a switching operation based on the switching control signal CS_SW and may be controlled to output a current through at least two of a plurality of paths, which include the connecting switch CSW, in some phases of a switching cycle.

As described above, when the target level of the output voltage VO is equal to or higher than the reference level (or when the switching regulator 10 operates in the second boost mode), the switch circuit 11 may be controlled using the first switch control scheme such that the level of a current flowing in the connecting switch CSW is limited. When the target level of the output voltage VO is lower than the reference level (or when the switching regulator 10 operates in the buck mode, the buck-boost mode, or the first boost mode), the switch circuit 11 may be controlled using the second switch control scheme since the level of a current flowing in the connecting switch CSW is not sufficiently high as to trigger limitation.

According to some example embodiments, the switch circuit 11 may provide a voltage, which is boosted using the first and second flying capacitors CFa and CFb, to the inductor L as an applied voltage VX in some phases of a switching cycle in a certain operating mode under the control of the controller 12. In some embodiments, the applied voltage VX may be approximately at least three times the input voltage VIN. However, this is just an example embodiment and the inventive concepts are not limited thereto. The switch circuit 11 may be connected to more flying capacitors and may provide a voltage boosted in proportion to the number of flying capacitors to the inductor L as the applied voltage VX. As described above, when the switch circuit 11 applies a voltage boosted to a high level to the inductor L in a phase of a switching cycle in a certain operating mode, a duration (or a time) of the phase is reduced, and therefore, a significant duration of a phase for charge of each of the first and second flying capacitors CFa and CFb may be secured, allowing the level of a current, which passes through the connecting switch CSW to charge each of the first and second flying capacitors CFa and CFb, to be lowered. As a result, a current load on the connecting switch CSW may be reduced in the phase for the charge of each of the first and second flying capacitors CFa and CFb. This will be described in detail below with reference to the drawings including FIG. 9.

Hereinafter, the operation of the switching regulator 10 will be described in detail.

The switch circuit 11 may receive the switching control signal CS_SW from the controller 12 and may further include a plurality of switches, which are turned on or off in response to the switching control signal CS_SW. The switch circuit 11 may control the inductor current IL, which flows through the inductor L, by controlling a voltage provided to the inductor L based on the switching control signal CS_SW. For example, the switch circuit 11 may induce the inductor current IL in response to the switching control signal CS_SW to charge the output capacitor CO and may control the inductor current IL in response to the switching control signal CS_SW to prevent the output capacitor CO from being overcharged or reduce the occurrence of overcharge of the output capacitor CO. When there is a load (e.g., a load LD in FIG. 4) receiving the output voltage VO of the switching regulator 10, at least a portion of the inductor current IL may be provided to the load. An example of the switch circuit 11 will be described below with reference to the drawings including FIG. 4.

The inductor L and the output capacitor CO may be connected in series to each other, and accordingly, the inductor current IL may be the same or substantially the same as an output delivery current ID when a current flowing to the controller 12 is ignored. The inductor current IL may depend on a voltage (e.g., VX in FIG. 1) applied to the inductor L by the switch circuit 11. Here, a voltage of a node connected to the switch circuit 11 and the inductor L may be referred to as the applied voltage VX. In some embodiments, the capacitance of the output capacitor CO may be determined based on a current provided to (or consumed by) a load connected to the output terminal 14 of the switching regulator 10. In some embodiments, the inductance of the inductor L may be determined based on the capacitance of the output capacitor CO and/or a switching frequency. In some embodiments, the capacitance of the first and second flying capacitors CFa and CFb may be determined based on the current provided to the load, the switching frequency, the input voltage VIN, and/or the output voltage VO.

The controller 12 may generate the switching control signal CS_SW based on the reference voltage VREF and the output voltage VO. For example, the controller 12 may generate a feedback voltage by dividing the output voltage VO using at least two resistors, compare the feedback voltage with the reference voltage VREF, and generate the switching control signal CS_SW having a duty ratio adjusted such that the feedback voltage is equal to or similar to the reference voltage VREF, wherein the duty ratio is involved in switch on/off control. Accordingly, the level of the output voltage VO may be determined based on the level of the reference voltage VREF and may be changed by changing the level of the reference voltage VREF. In some embodiments, to perform the operations described above, the controller 12 may detect the inductor current IL or the output delivery current ID and generate the switching control signal CS_SW based on a detected current level. In some embodiments, the controller 12 may generate the switching control signal CS_SW based on both the output voltage VO and the current of the output node 14. In some embodiments, the controller 12 may include at least one comparator and at least one logic gate.

The controller 12 may generate the switching control signal CS_SW such that the switch circuit 11 and the first and second flying capacitors CFa and CFb connected to the switch circuit 11 function as a charge pump, and the applied voltage VX boosted by the charge pump may be provided to the inductor L in a phase of a switching cycle. In some embodiments, a boosted voltage may be multiples of the input voltage VIN according to the connection between the switch circuit 11 and the first and second flying capacitors CFa and CFb. Through such configuration of the switch circuit 11, the output delivery current ID provided to the output capacitor CO and the load may be continuously changed. As the output delivery current ID is continuously changed, the level of the output delivery current ID may be quickly changed and the noise of the output voltage VO may be reduced.

The output voltage VO generated by the switching regulator 10 may function as a supply voltage that provides electric power to electronic components, which may be referred to as loads of the switching regulator 10. For example, the output voltage VO may be provided to a digital circuit processing digital signals, an analog circuit processing analog signals, and/or a radio frequency (RF) circuit processing RF signals.

Figure 2A:
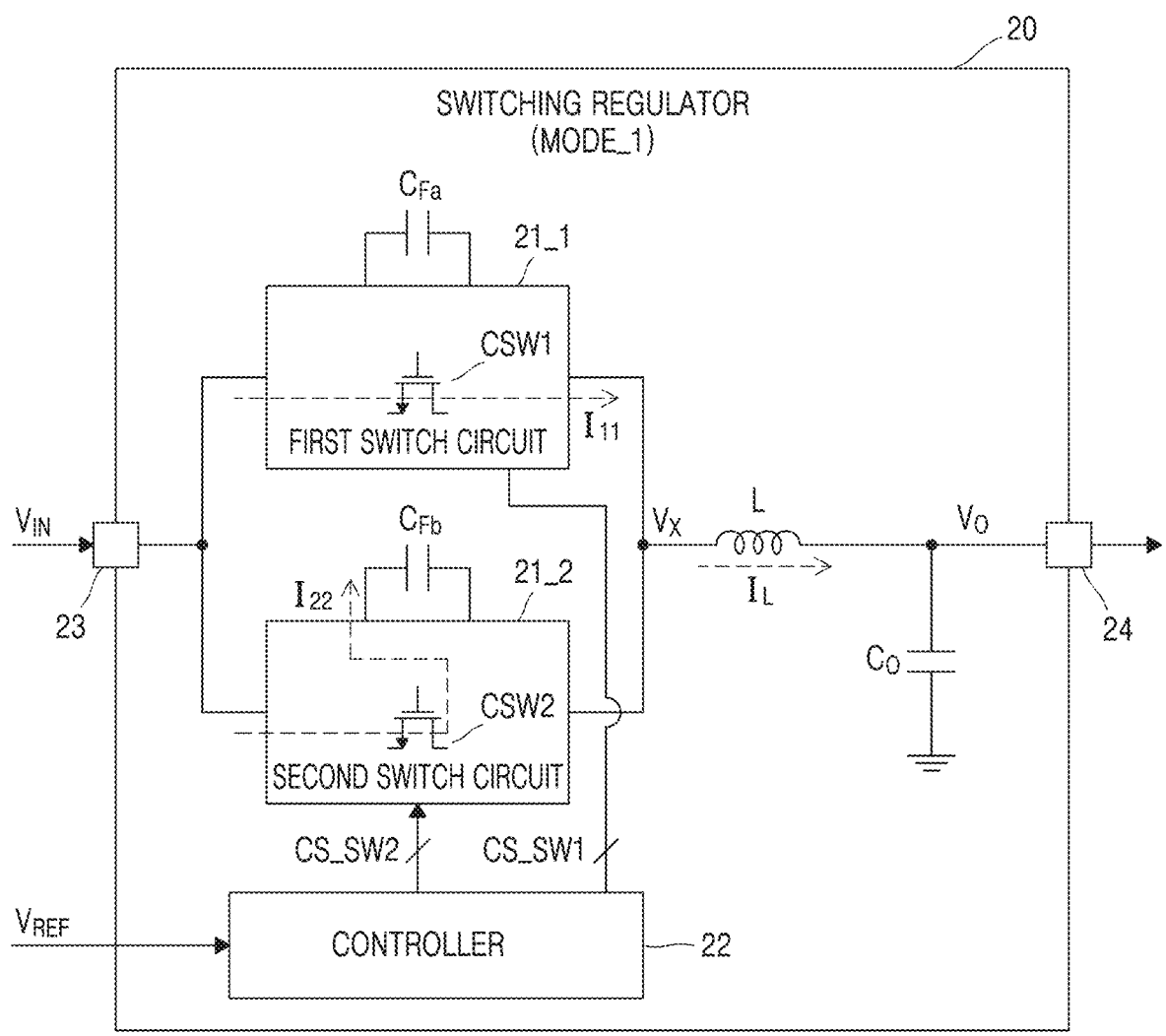
FIGS. 2A through 3B are diagrams of a switching regulator according to an example embodiment.
Figure 2B:
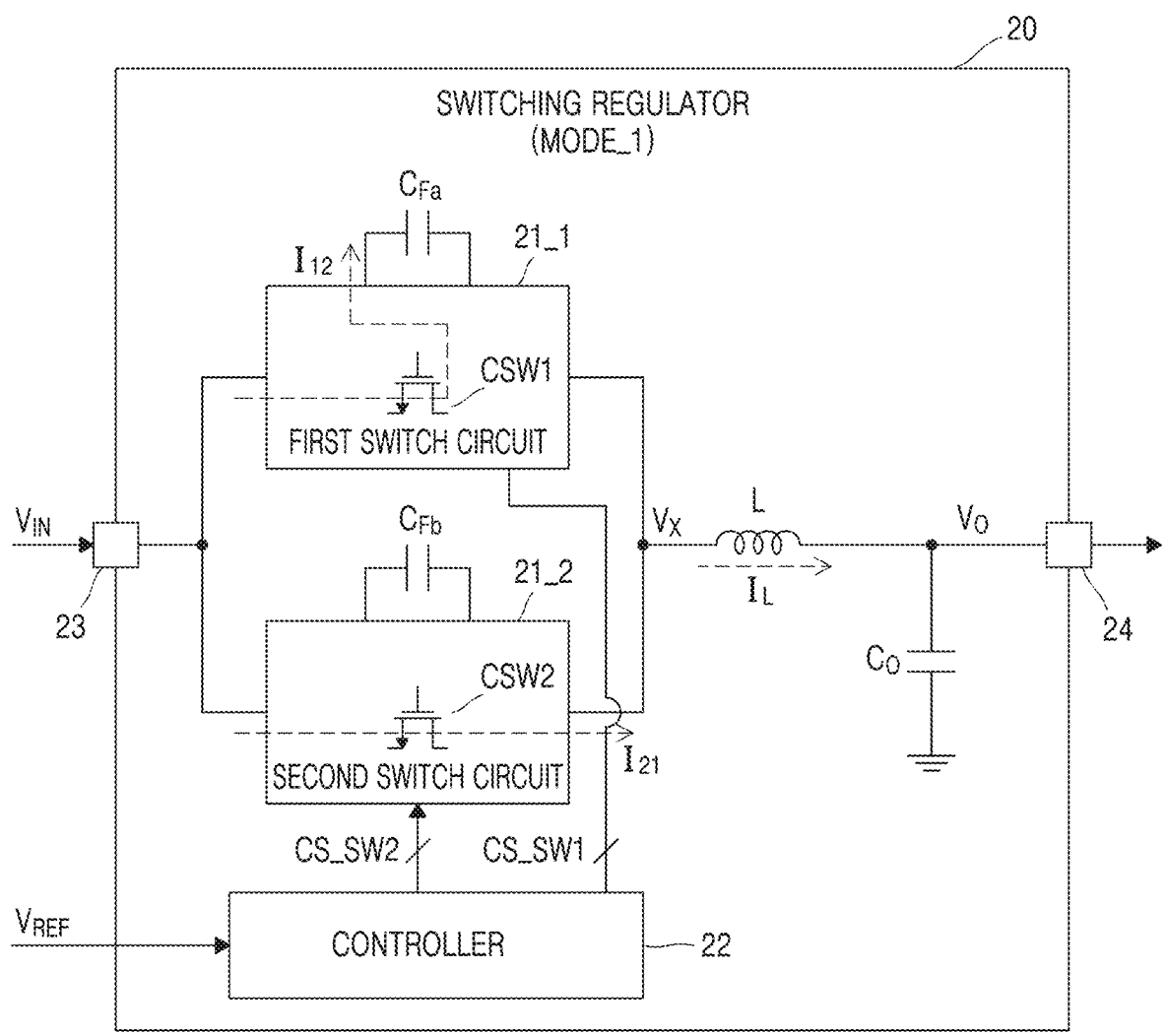
Figure 3A:
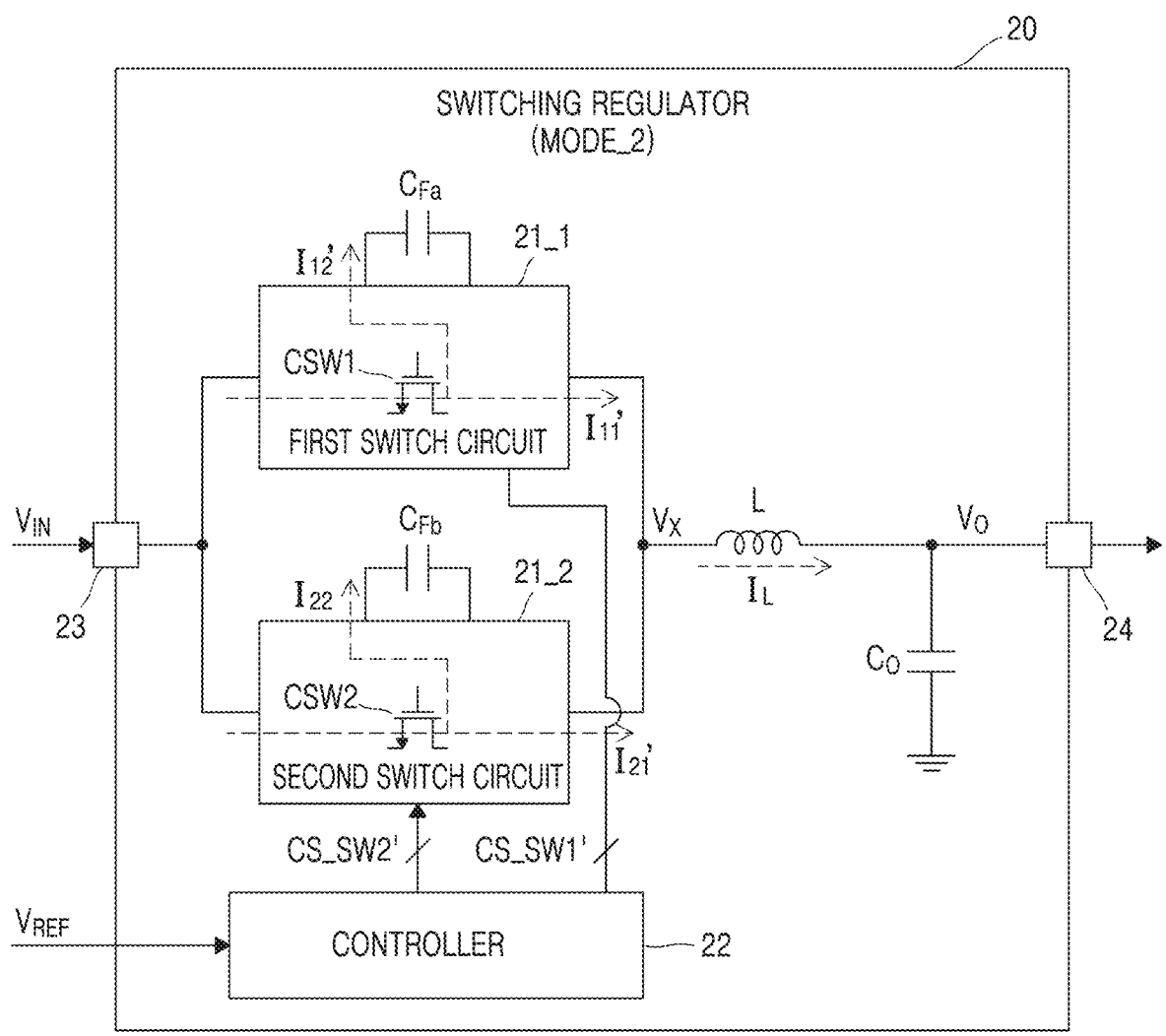
Figure 3B:
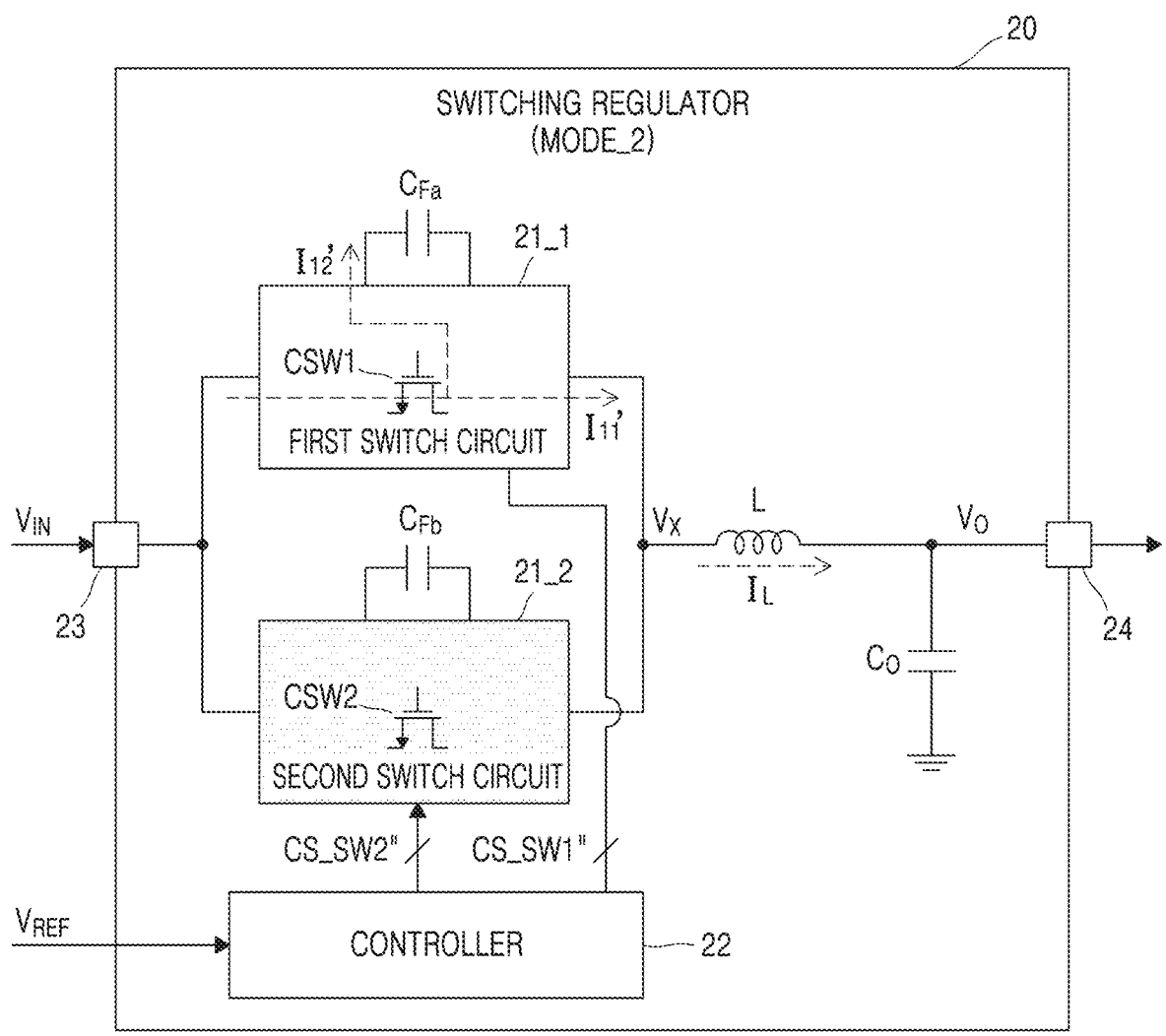

FIGS. 2A through 3B are diagrams of a switching regulator according to an example embodiment. In detail, FIGS. 2A and 2B are circuit diagrams that illustrate the operation of a switching regulator 20 in a first operating mode MODE_1, and FIGS. 3A and 3B are circuit diagrams that illustrate the operation of the switching regulator 20 in a second operating mode MODE_2. Hereinafter, when descriptions are made with reference to FIGS. 2A through 3B, redundant ones are omitted.

Referring to FIG. 2A, the switching regulator 20 may include a first switch circuit 21_1, a second switch circuit 21_2, a controller 22, an input node 23, an output node 24, a first flying capacitor CFa, a second flying capacitor CFb, the inductor L, and/or the output capacitor CO. The first switch circuit 21_1 may include a first connecting switch CSW1 and/or a plurality of switches, and may be connected to the first flying capacitor CFa. The first connecting switch CSW1 may selectively connect an end of the first flying capacitor CFa to the input node 23. The second switch circuit 21_2 may include a second connecting switch CSW2 and/or a plurality of switches, and may be connected to the second flying capacitor CFb. The second connecting switch CSW2 may selectively connect an end of the second flying capacitor CFb to the input node 23. According to some example embodiments, operations described herein as being performed by the controller 22 may be performed by processing circuitry. According to some example embodiments, operations described herein as being performed by the switching regulator 20 may be performed based on control signals generated by the controller 22.

According to an embodiment, the first switch circuit 21_1 and the second switch circuit 21_2 may be connected in parallel to each other between the input node 23 and the inductor L. The controller 22 may individually control the first switch circuit 21_1 and the second switch circuit 21_2. The first switch circuit 21_1 and the second switch circuit 21_2 that are controlled using an interleaving switch control scheme when the switching regulator 20 operates in the first operating mode MODE_1 will be described below. It is assumed that the first operating mode MODE_1 is a mode (e.g., the second boost mode) set when, as described above, the target level of the output voltage VO is equal to or higher than the reference level. However, this is just an example embodiment, and the inventive concepts are not limited thereto. The first operating mode MODE_1 may further include at least one of various operating modes including the buck-boost mode and the first boost mode.

In a first phase of a switching cycle, the first switch circuit 21_1 may be controlled to pass a first current I11, which is for providing a voltage boosted by the first flying capacitor CFa to the inductor L as the applied voltage VX, through the first connecting switch CSW1 based on a first switching control signal CS_SW1 received from the controller 22. In the first phase, the second switch circuit 21_2 may be controlled to pass a second current I22, which is for charging the second flying capacitor CFb, through the second connecting switch CSW2 based on a second switching control signal CS_SW2 received from the controller 22.

Referring to FIG. 2B, in a second phase of the switching cycle, the first switch circuit 21_1 may be controlled to pass a third current I12, which is for charging the first flying capacitor CFa, through the first connecting switch CSW1 based on the first switching control signal CS_SW1 received from the controller 22. In the second phase, the second switch circuit 21_2 may be controlled to pass a fourth current I21, which is for providing a voltage boosted by the second flying capacitor CFb to the inductor L as the applied voltage VX, through the second connecting switch CSW2 based on the second switching control signal CS_SW2 received from the controller 22. As described above, the controller 22 performs switching control such that each of the first connecting switch CSW1 and the second connecting switch CSW2 may pass currents, e.g., I11 and I22, or I12 and I21, through respective paths in the first and second phases, respectively, thereby reducing a current load on each of the first connecting switch CSW1 and the second connecting switch CSW2.

In an embodiment, a phase in which the first flying capacitor CFa connected to the first switch circuit 21_1 is connected to the inductor L may be different from a phase in which the second flying capacitor CFb connected to the second switch circuit 21_2 is connected to the inductor L, and a phase in which the first flying capacitor CFa is charged with the input voltage VIN may be different from a phase in which the second flying capacitor CFb is charged with the input voltage VIN, according to the interleaving switch control scheme described with reference to FIGS. 2A and 2B. In other words, the interleaving switch control scheme may refer to a method of controlling the first switch circuit 21_1 and the second switch circuit 21_2 such that the first flying capacitor CFa and the second flying capacitor CFb are alternately charged with the input voltage VIN and alternately connected to the inductor L in different phases of a switching cycle.

The first switch circuit 21_1 and the second switch circuit 21_2 that are controlled using a synchronous switch control scheme when the switching regulator 20 operates in the second operating mode MODE_2 will be described below with reference to FIGS. 3A and 3B. It is assumed that the second operating mode MODE_2 is a mode (e.g., the buck mode, the buck-boost mode, or the first boost mode) set when, as described above, the target level of the output voltage VO is lower than the reference level. However, this is just an example embodiment, and the inventive concepts are not limited thereto. The second operating mode MODE_2 may include other operating modes than the first operating mode MODE_1.

Referring to FIG. 3A, in a certain phase of a switching cycle, the first switch circuit 21_1 may be controlled to pass a first current I11' and a second current I12' through the first connecting switch CSW1 based on a first switching control signal CS_SW1' received from the controller 22. The first current I11' is for providing the input voltage VIN to the inductor L and the second current I12 is for charging the first flying capacitor CFa. In the first phase, the second switch circuit 21_2 may be controlled to pass a third current I21' and a fourth current I22' through the second connecting switch CSW2 based on a second switching control signal CS_SW2'. The third current I21' is for providing the input voltage VIN to the inductor L and the fourth current I22' is for charging the second flying capacitor CFb. As described above, in the second operating mode MODE_2 in which a current load on each of the first connecting switch CSW1 and the second connecting switch CSW2 is not expected to be excessive, the controller 22 may perform switching control such that each of the first connecting switch CSW1 and the second connecting switch CSW2 may pass currents, e.g., I11', I12', I21' and I22', through respective paths in one phase.

The synchronous switch control scheme may refer to a method of identically or similarly controlling the first switch circuit 21_1 and the second switch circuit 21_2 such that the first flying capacitor CFa and the second flying capacitor CFb are charged and/or connected to the inductor L in one phase.

Referring to FIG. 3B, in some embodiments, when the switching regulator 20 is in the second operating mode MODE_2, the controller 22 may select one of the first switch circuit 21_1 and the second switch circuit 21_2 and generate the output voltage VO using the selected switch circuit. In detail, the controller 22 may select the first switch circuit 21_1 and provide a first switching control signal CS_SW1" to the first switch circuit 21_1 such that the first switch circuit 21_1 is controlled to pass the first current I11' for providing the input voltage VIN to the inductor L and the second current I12 for charging the first flying capacitor CFa through the first connecting switch CSW1 in the certain phase of the switching cycle. The controller 22 may disable the second switch circuit 21_2 (e.g., disconnect the second switch circuit 21_2 from the input voltage VIN and/or the inductor L) by providing a second switching control signal CS_SW2" to the second switch circuit 21_2. The switching regulator 20 may reduce power consumption by disabling an unselected switch circuit in the second operating mode MODE_2.

Figure 4:
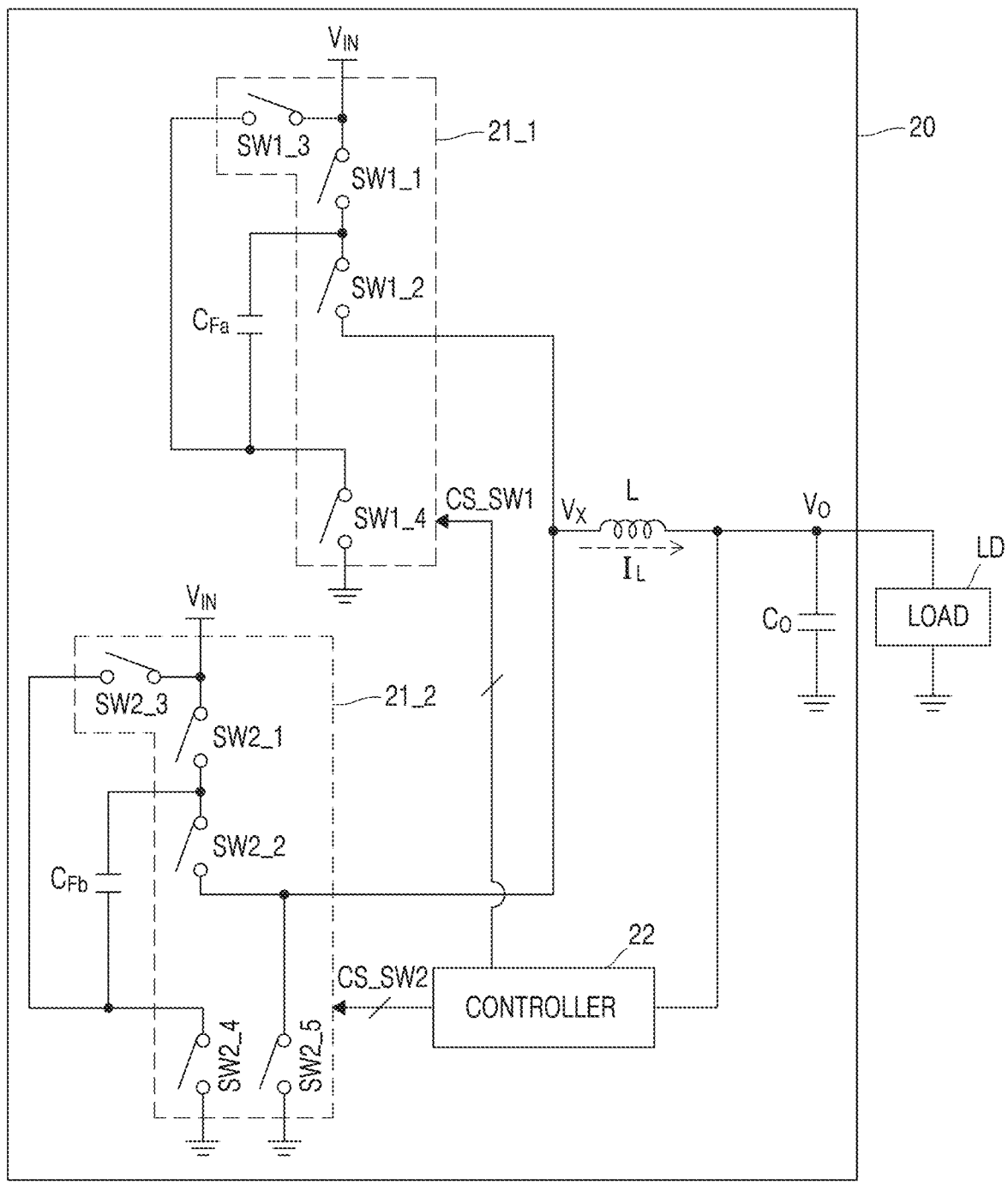
FIG. 4 is a circuit diagram of a switching regulator 20 according to an example embodiment.

FIG. 4 is a circuit diagram of the switching regulator 20 according to an example embodiment.

Referring to FIG. 4, the switching regulator 20 may include the first switch circuit 21_1, the second switch circuit 21_2, the controller 22, the first flying capacitor CFa, the second flying capacitor CFb, the inductor L, and/or the output capacitor CO. The load LD may be connected to the switching regulator 20. Redundant descriptions already given with reference to FIGS. 2A through 3B will be omitted. Switches illustrated in the drawings including FIG. 4 may each have a structure that electrically connects or disconnects both ends according to a switching control signal, e.g., CS_SW1 or CS_SW2, provided from the controller 22. A first switch SW1_1 of the first switch circuit 21_1 may correspond to the first connecting switch CSW1 in FIG. 2A, and a fifth switch SW2_1 may correspond to the second connecting switch CSW2 in FIG. 2A.

The first switch circuit 21_1 may include first through fourth switches SW1_1 through SW1_4. The first switch SW1_1 and the second switch SW1_2 may be sequentially connected in series between an input node and an end of the inductor L, and the third switch SW1_3 and the fourth switch SW1_4 may be sequentially connected in series between the input node and a ground node. The first flying capacitor CFa may have an end connected to the first and second switches SW1_1 and SW1_2 and an end connected to the third and fourth switches SW1_3 and SW1_4.

The second switch circuit 21_2 may include fifth through ninth switches SW2_1 through SW2_5. The fifth switch SW2_1 and the sixth switch SW2_2 may be sequentially connected in series between the input node and the inductor L, the seventh switch SW2_3 and the eighth switch SW2_4 may be sequentially connected in series between the input node and the ground node, and the ninth switch SW2_5 may be connected between an end of the sixth switch SW2_2 and the ground node. According to some example embodiments, the controller 22 may generate the first and second switching control signals CS_SW1 and CS_SW2 such that the first flying capacitor CFa, the first switch circuit 21_1, the second flying capacitor CFb, and the second switch circuit 21_2 function as a charge pump, as described below. The controller 22 may generate the first and second switching control signals CS_SW1 and CS_SW2 such that the applied voltage VX boosted by the charge pump is applied to the inductor L.

In an embodiment, the controller 22 may control the first switch circuit 21_1 and the second switch circuit 21_2 using different switch control schemes according to operating modes of the switching regulator 20. In other words, the controller 22 may reduce a current load on the first switch SW1_1 of the first switch circuit 21_1 and the fifth switch SW2_1 of the second switch circuit 21_2 by limiting a current flowing in the first switch SW1_1 and the fifth switch SW2_1 in a plurality of phases of a switching cycle in the first operating mode, e.g., the second boost mode.

Figure 5A:
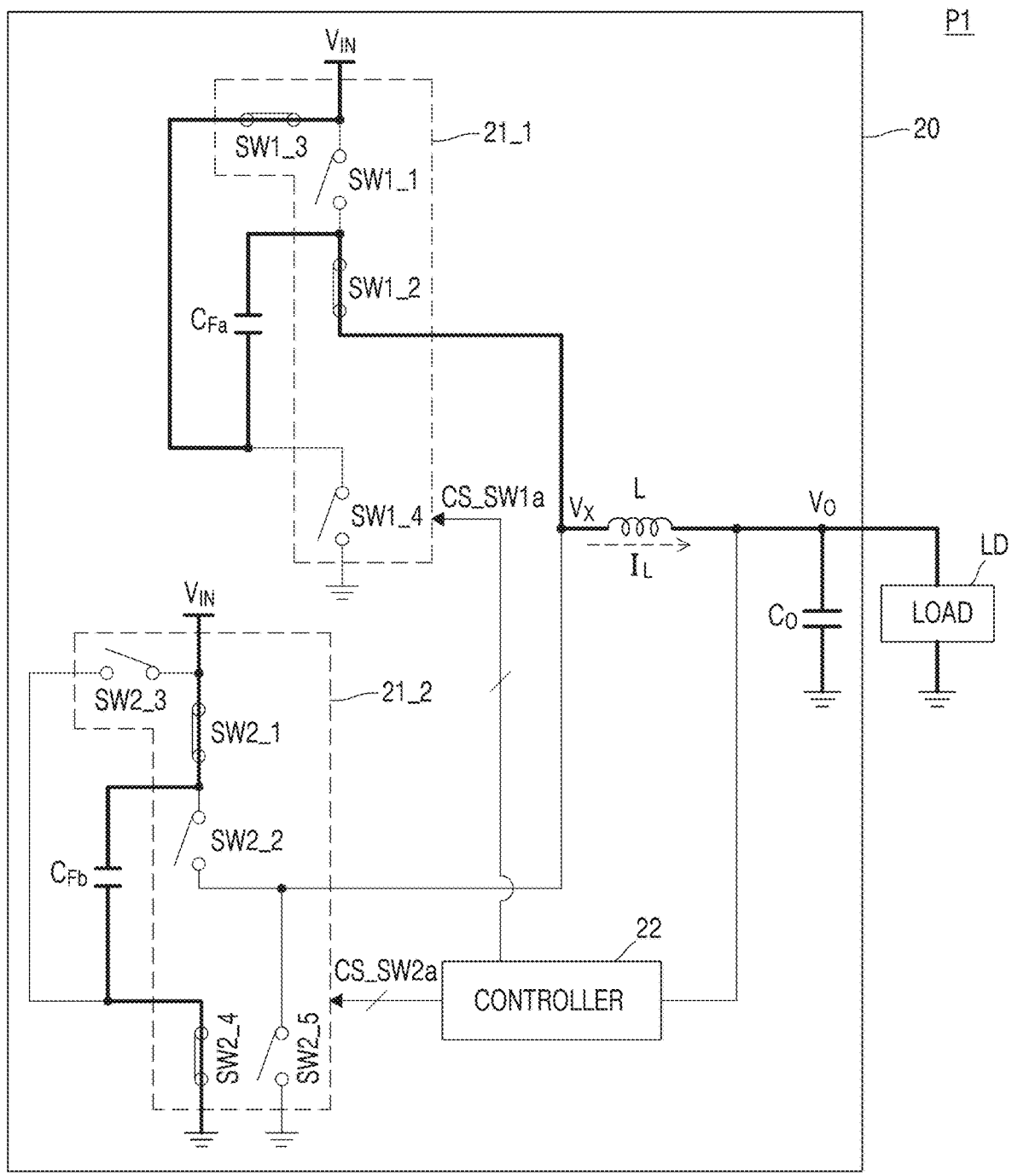
FIGS. 5A through 5D are circuit diagrams of the switching regulator 20, which operates in a second boost mode as a first operating mode, according to an example embodiment.
Figure 5B:
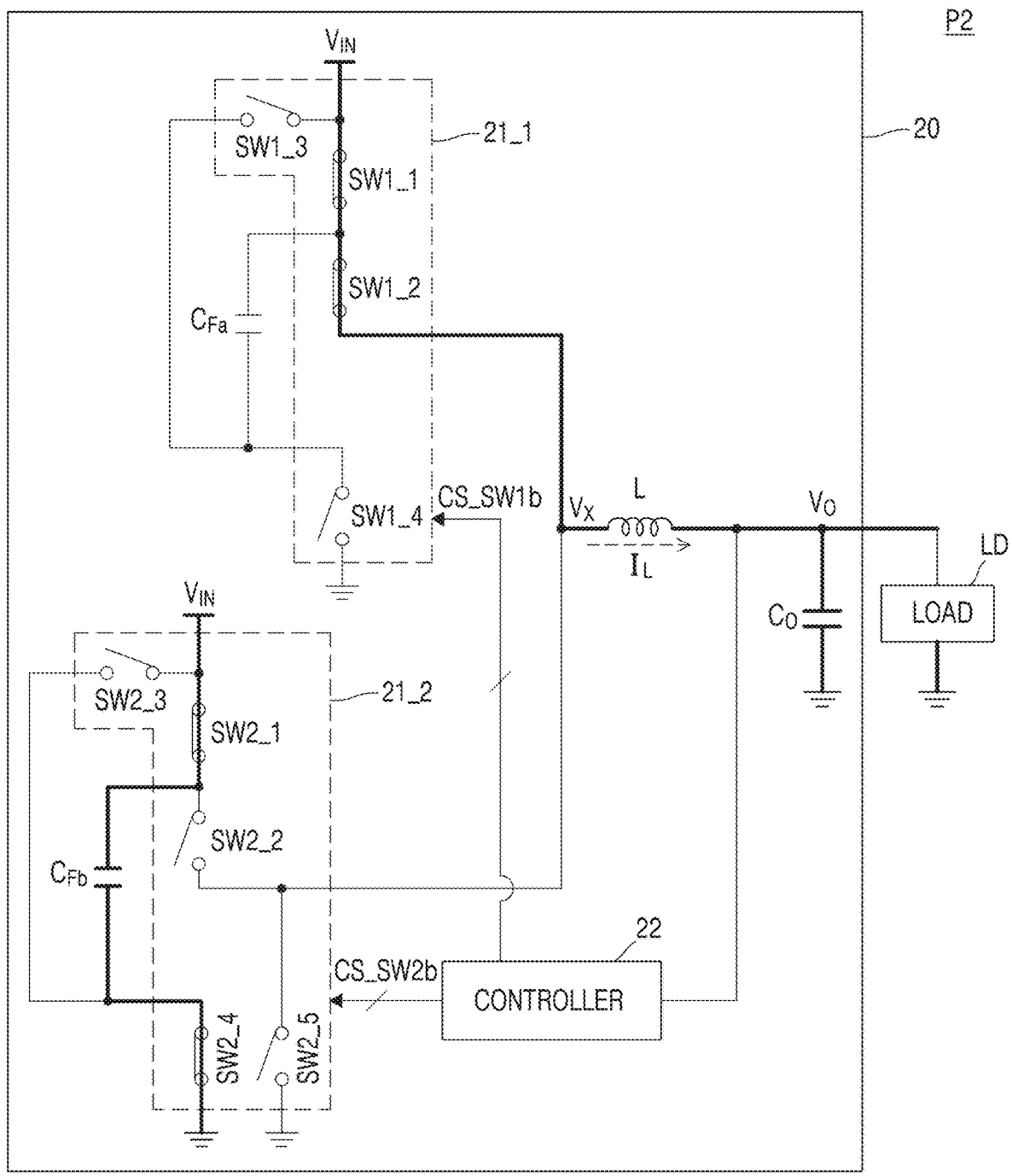
Figure 5C:
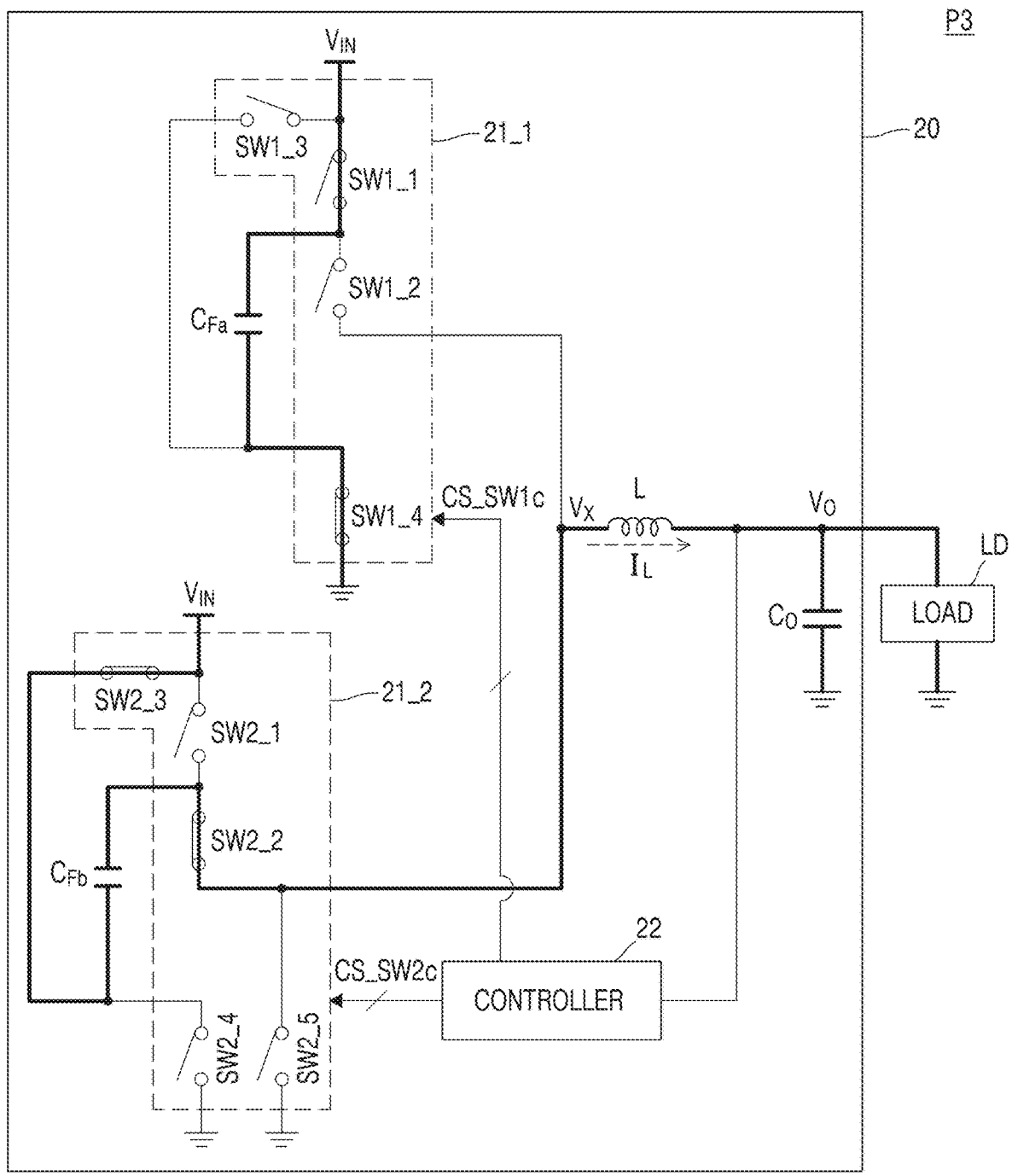
Figure 5D:
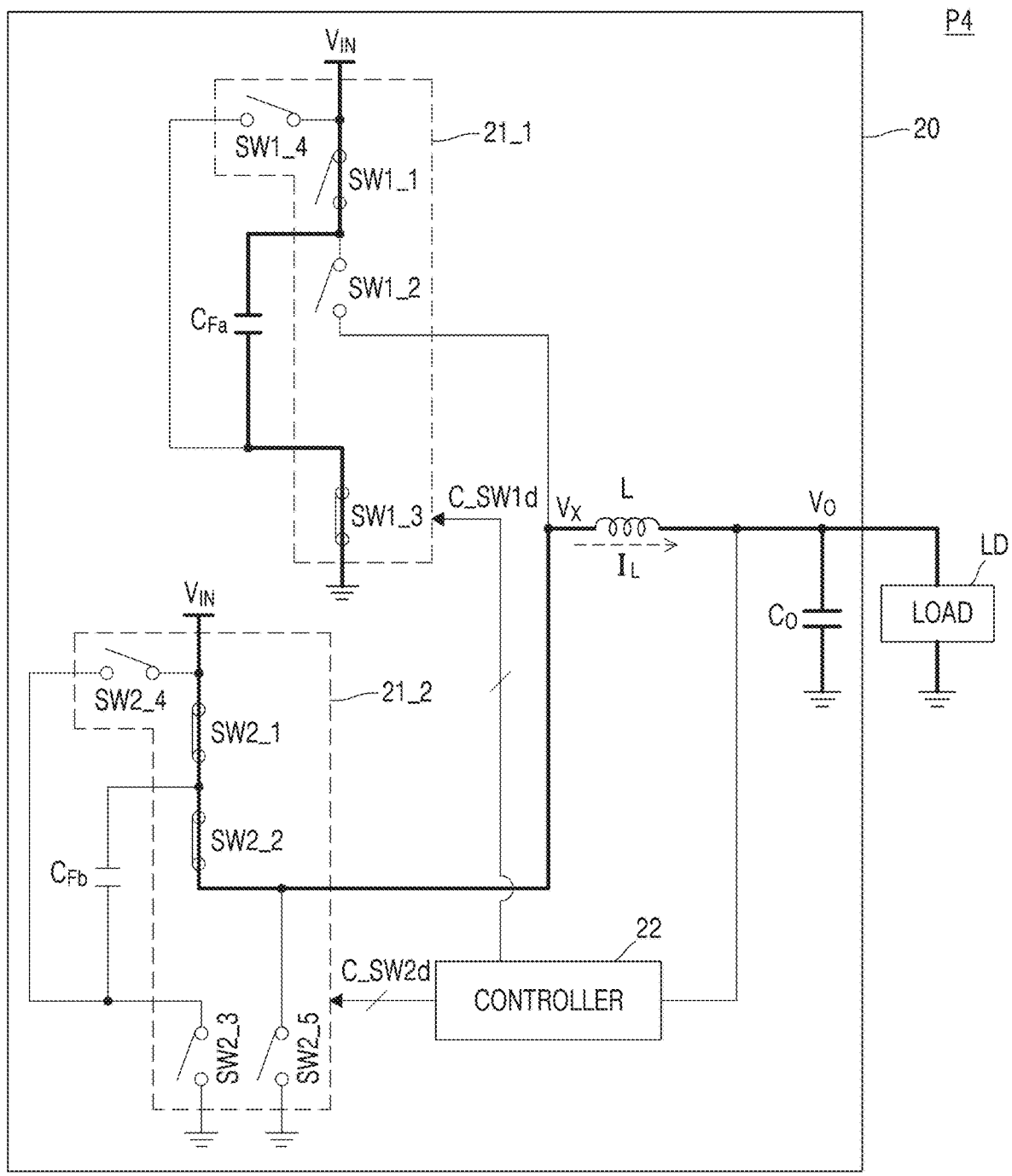
Figure 5E:
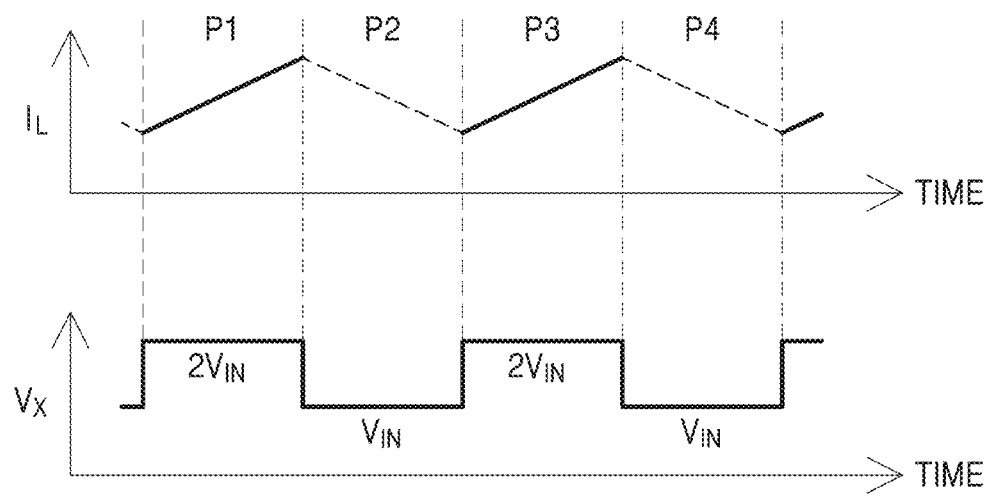
FIG. 5E is a timing chart showing the operation of the switching regulator 20 in the second boost mode, in which respective states of FIGS. 5A through 5D are sequentially repeated, according to some example embodiments.

FIGS. 5A through 5D are circuit diagrams of the switching regulator 20, which operates in the second boost mode as the first operating mode, according to an example embodiment, and FIG. 5E is a timing chart showing the operation of the switching regulator 20 in the second boost mode, in which respective states of FIGS. 5A through 5D are sequentially repeated, according to some example embodiments. FIG. 5A illustrates the switching regulator 20 in a first phase P1, FIG. 5B illustrates the switching regulator 20 in a second phase P2, FIG. 5C illustrates the switching regulator 20 in a third phase P3, and FIG. 5D illustrates the switching regulator 20 in a fourth phase P4. In FIGS. 5A through 5D, paths through which current flows and switches in an on-state are illustrated in bold.

Referring to FIG. 5A, in the second boost mode, the controller 22 may generate a first switching control signal CS_SW1a and a second switching control signal CS_SW2a in the first phase P1 such that the second and third switches SW1_2 and SW1_3 of the first switch circuit 21_1 and the fifth and eighth switches SW2_1 and SW2_4 of the second switch circuit 21_2 are turned on and the other switches, e.g., the first, fourth, sixth, seventh, and ninth switches SW1_1, SW1_4, SW2_2, SW2_3, and SW2_5, are turned off.

Both ends of the first flying capacitor CFa may be respectively connected to an input node and the inductor L. The applied voltage VX boosted by the first flying capacitor CFa may be provided to the inductor L through the second switch SW1_2, which is in the on-state. Both ends of the second flying capacitor CFb may be respectively connected to the input node and a ground node, and the second flying capacitor CFb may be charged with the input voltage VIN. The inductor current IL may flow from the input node to the output capacitor CO and the load LD through the third switch SW1_3, the first flying capacitor CFa, and the second switch SW1_2. Accordingly, as shown in FIG. 5E, the inductor current IL may gradually increase in the first phase P1, and the applied voltage VX provided to the inductor L may be equal to or similar to a boosted voltage, e.g., a voltage which is about twice the input voltage VIN.

Referring to FIG. 5B, in the second boost mode, the controller 22 may generate a first switching control signal CS_SW1b and a second switching control signal CS_SW2b in the second phase P2 such that the first and second switches SW1_1 and SW1_2 of the first switch circuit 21_1 and the fifth and eighth switches SW2_1 and SW2_4 of the second switch circuit 21_2 are turned on and the other switches, e.g., the third, fourth, sixth, seventh, and ninth switches SW1_3, SW1_4, SW2_2, SW2_3, and SW2_5, are turned off.

In the second phase P2, both ends of the first flying capacitor CFa may float and both ends of the second flying capacitor CFb may be respectively connected to the input node and the ground node as in the first phase P1, and therefore, the second flying capacitor CFb may be charged with the input voltage VIN. The inductor current IL may flow from the input node to the output capacitor CO and the load LD through the first switch SW1_2 and the second switch SW1_2, which are in the on-state. Accordingly, as shown in FIG. 5E, the inductor current IL may gradually decrease in the second phase P2, and the applied voltage VX provided to the inductor L may be equal to or similar to the input voltage VIN.

Referring to FIG. 5C, in the second boost mode, the controller 22 may generate a first switching control signal CS_SW1c and a second switching control signal CS_SW2c in the third phase P3 such that the first and fourth switches SW1_1 and SW1_4 of the first switch circuit 21_1 and the sixth and seventh switches SW2_2 and SW2_3 of the second switch circuit 21_2 are turned on and the other switches, e.g., the second, third, fifth, eighth, and ninth switches SW1_2, SW1_3, SW2_1, SW2_4, and SW2_5, are turned off.

Both ends of the first flying capacitor CFa may be respectively connected to the input node and the ground node, and the first flying capacitor CFa may be charged with the input voltage VIN. Both ends of the second flying capacitor CFb may be respectively connected to the input node and the inductor L, and the applied voltage VX boosted by the second flying capacitor CFb may be provided to the inductor L through the sixth switch SW2_2, which is in the on-state. The inductor current IL may flow from the input node to the output capacitor CO and the load LD through the seventh switch SW2_3, the second flying capacitor CFb, and the sixth switch SW2_2. Accordingly, as shown in FIG. 5E, the inductor current IL may gradually increase in the third phase P3, and the applied voltage VX provided to the inductor L may be equal to or similar to a boosted voltage, e.g., a voltage which is about twice the input voltage VIN.

Referring to FIG. 5D, in the second boost mode, the controller 22 may generate a first switching control signal CS_SW1d and a second switching control signal CS_SW2d in the fourth phase P4 such that the first and fourth switches SW1_1 and SW1_4 of the first switch circuit 21_1 and the fifth and sixth switches SW2_1 and SW2_2 of the second switch circuit 21_2 are turned on and the other switches, e.g., the second, third, seventh, eighth, and ninth switches SW1_2, SW1_3, SW2_3, SW2_4, and SW2_5, are turned off.

In the fourth phase P4, both ends of the first flying capacitor CFa may be respectively connected to the input node and the ground node as in the third phase P3, and therefore, the first flying capacitor CFa may be charged with the input voltage VIN. Both ends of the second flying capacitor CFb may float. The inductor current IL may flow from the input node to the output capacitor CO and the load LD through the fifth switch SW2_1 and the sixth switch SW2_2, which are in the on-state. Accordingly, as shown in FIG. 5E, the inductor current IL may gradually decrease in the fourth phase P4, and the applied voltage VX provided to the inductor L may be equal to or similar to the input voltage VIN.

As described above, in the second boost mode, the controller 22 may control the first switch circuit 21_1 and the second switch circuit 21_2 based on the interleaving switch control scheme such that the first flying capacitor CFa and the second flying capacitor CFb are alternately charged and connected to the inductor L in different phases. The operations of the switching regulator 20 in the first through fourth phases P1 through P4, which are illustrated in FIGS. 5A through 5D, are just example embodiments, and the inventive concepts are not limited thereto. The operation of the switching regulator 20 in the second phase P2 of FIG. 5B may be substituted with the operation of the switching regulator 20 of FIG. 5D, and the operation of the switching regulator 20 in the fourth phase P4 of FIG. 5D may be substituted with the operation of the switching regulator 20 of FIG. 5B.

Figure 6A:
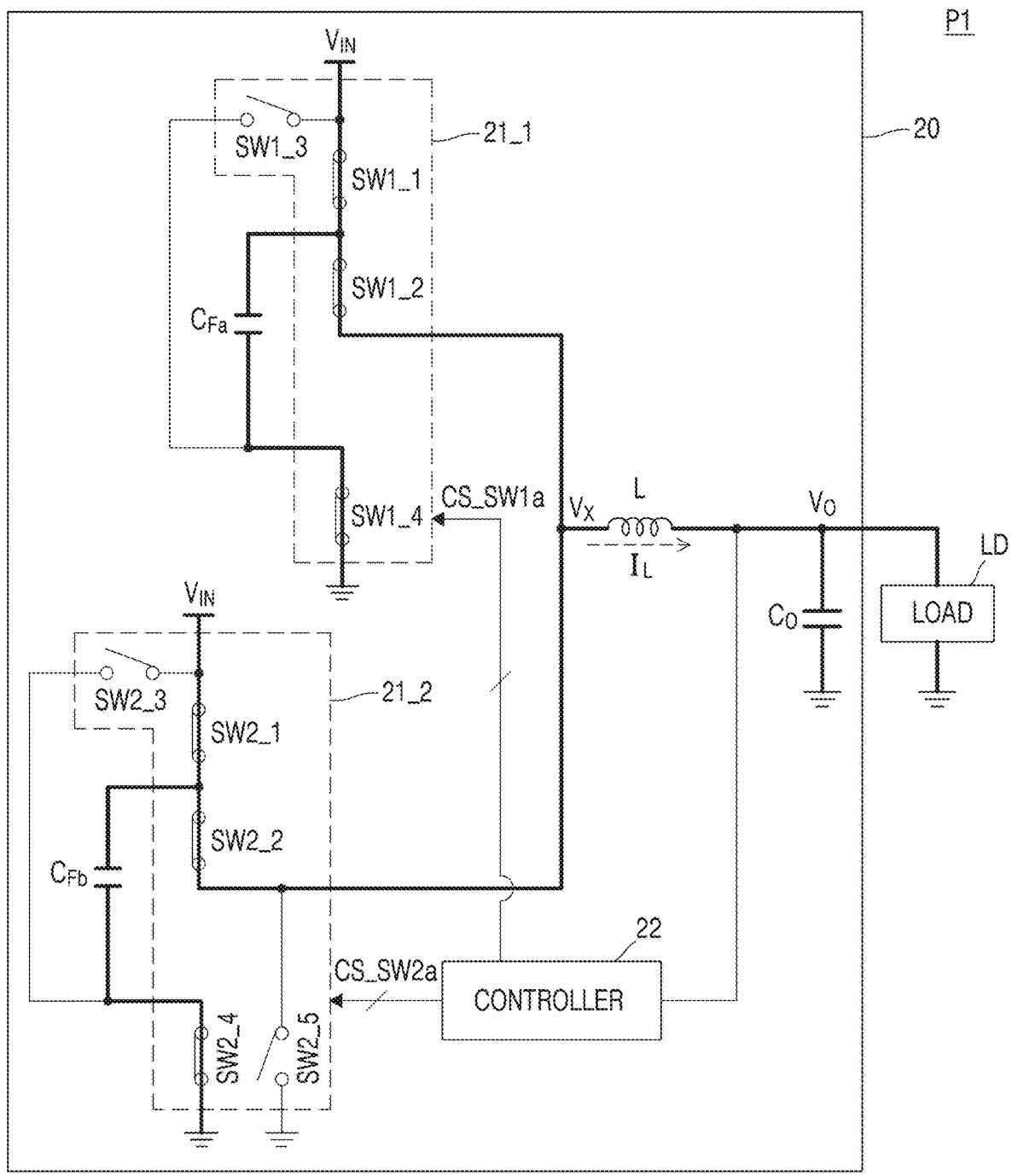
FIGS. 6A and 6B are circuit diagrams of the switching regulator 20, which operates in a buck mode as a second operating mode, according to an example embodiment.
Figure 6B:
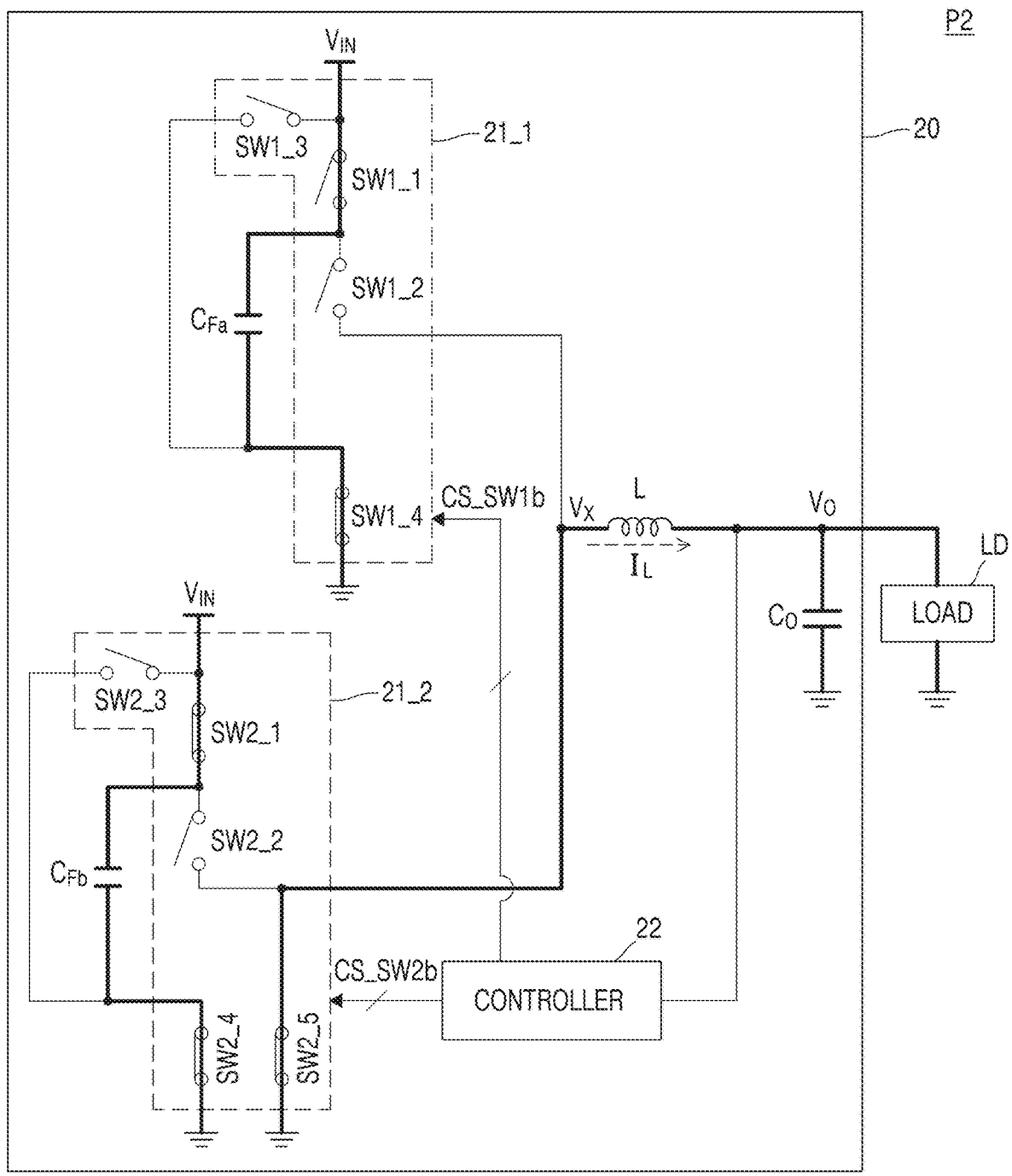
Figure 6C:
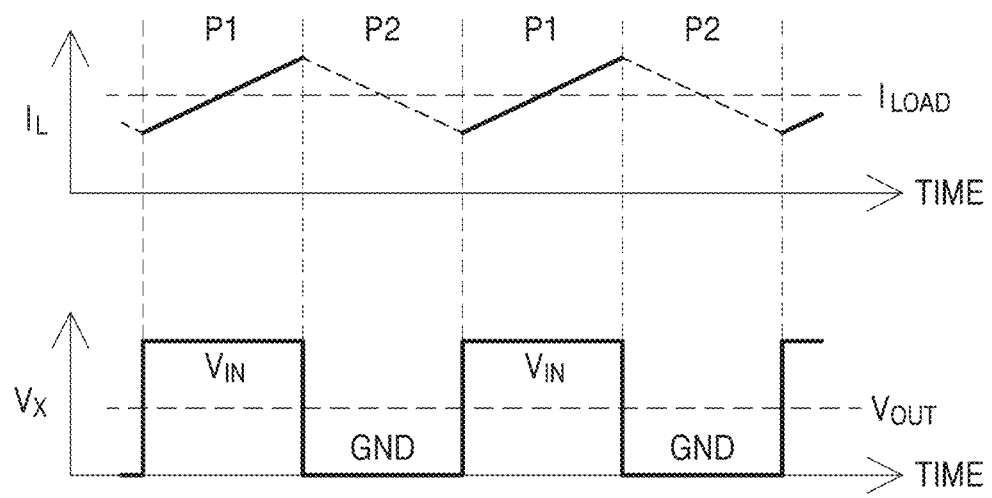
FIG. 6C is a timing chart showing the operation of the switching regulator 20 in the buck mode, in which respective states of FIGS. 6A and 6B are repeated.

FIGS. 6A and 6B are circuit diagrams of the switching regulator 20, which operates in the buck mode as the second operating mode, according to an example embodiment, and FIG. 6C is a timing chart showing the operation of the switching regulator 20 in the buck mode, in which respective states of FIGS. 6A and 6B are repeated. FIG. 6A illustrates the switching regulator 20 in the first phase P1, and FIG. 6B illustrates the switching regulator 20 in the second phase P2. In FIGS. 6A and 6B, paths through which current flows and switches in an on-state are illustrated in bold.

Referring to FIG. 6A, in the buck mode, the controller 22 may generate the first switching control signal CS_SW1$a$ and the second switching control signal CS_SW2$a$ in the first phase P1 such that the first, second, and fourth switches SW1_1, SW1_2, and SW1_4 of the first switch circuit 21_1 and the fifth, sixth, and eighth switches SW2_1, SW2_2, and SW2_4 of the second switch circuit 21_2 are turned on and the other switches, e.g., the third, seventh, and ninth switches SW1_3, SW2_3, and SW2_5, are turned off.

Both ends of each of the first and second flying capacitors CFa and CFb may be respectively connected to the input node and the ground node. The inductor L may be connected to the input node through the first switch circuit 21_1 and the second switch circuit 21_2 and thus receive the applied voltage VX corresponding to the input voltage VIN. In FIG. 6A unlike FIGS. 5A through 5D, a current for charging the first flying capacitor CFa and a current flowing to the inductor L may simultaneously or contemporaneously flow through the first switch SW1_1, and a current for charging the second flying capacitor CFb and a current flowing to the inductor L may simultaneously or contemporaneously flow through the fifth switch SW2_1. Accordingly, as shown in FIG. 6C, the inductor current IL may gradually increase, and the applied voltage VX may be equal to or similar to the input voltage VIN.

Referring to FIG. 6B, in the buck mode, the controller 22 may generate the first switching control signal CS_SW1$b$ and the second switching control signal CS_SW2$b$ in the second phase P2 such that the first and fourth switches SW1_1 and SW1_4 of the first switch circuit 21_1 and the fifth, eighth, and ninth switches SW2_1, SW2_4, and SW2_5 of the second switch circuit 21_2 are turned on and the other switches, e.g., the second, third, sixth, and seventh switches SW1_2, SW1_3, SW2_2, and SW2_3, are turned off.

Both ends of each of the first and second flying capacitors CFa and CFb may be respectively connected to the input node and the ground node. The inductor L may be connected to the ground node through the second switch circuit 21_2 and thus receive the applied voltage VX corresponding to a ground voltage. Accordingly, as shown in FIG. 6C, the inductor current IL may gradually decrease, and the applied voltage VX may be equal to or similar to the ground voltage.

Figure 7A:
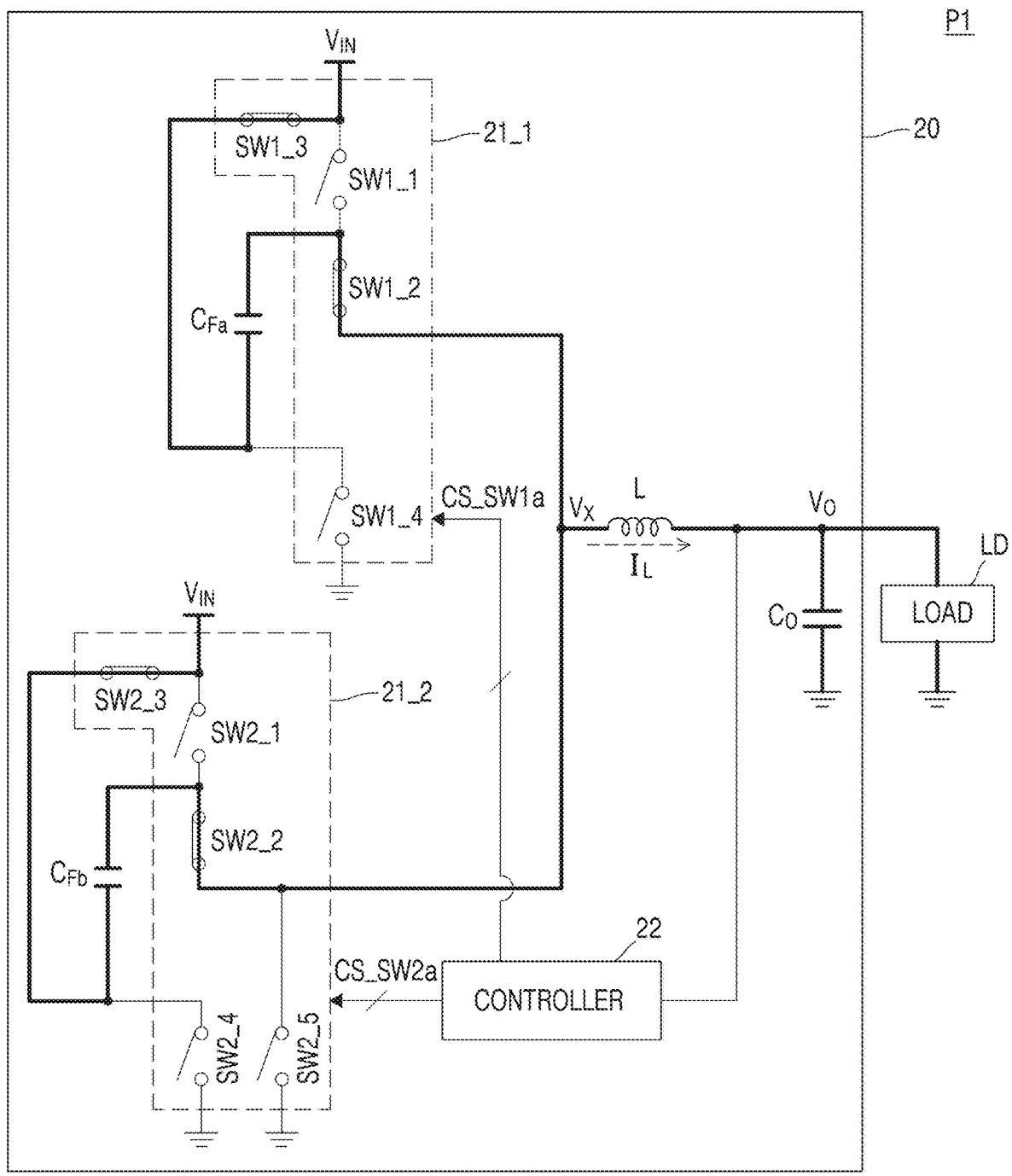
FIGS. 7A through 7C are circuit diagrams of the switching regulator 20, which operates in a buck-boost mode as a second operating mode, according to an example embodiment.
Figure 7B:
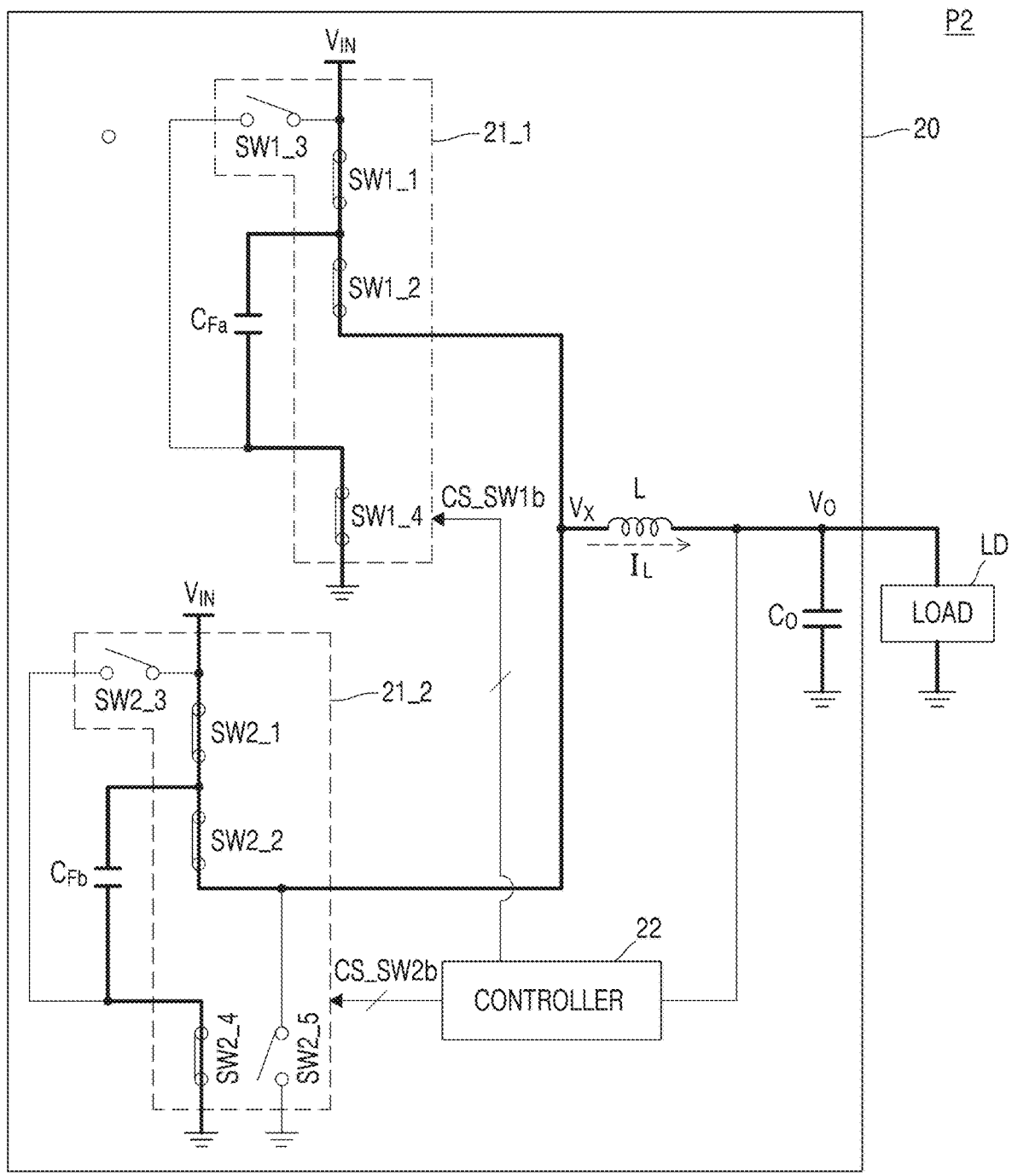
Figure 7C:
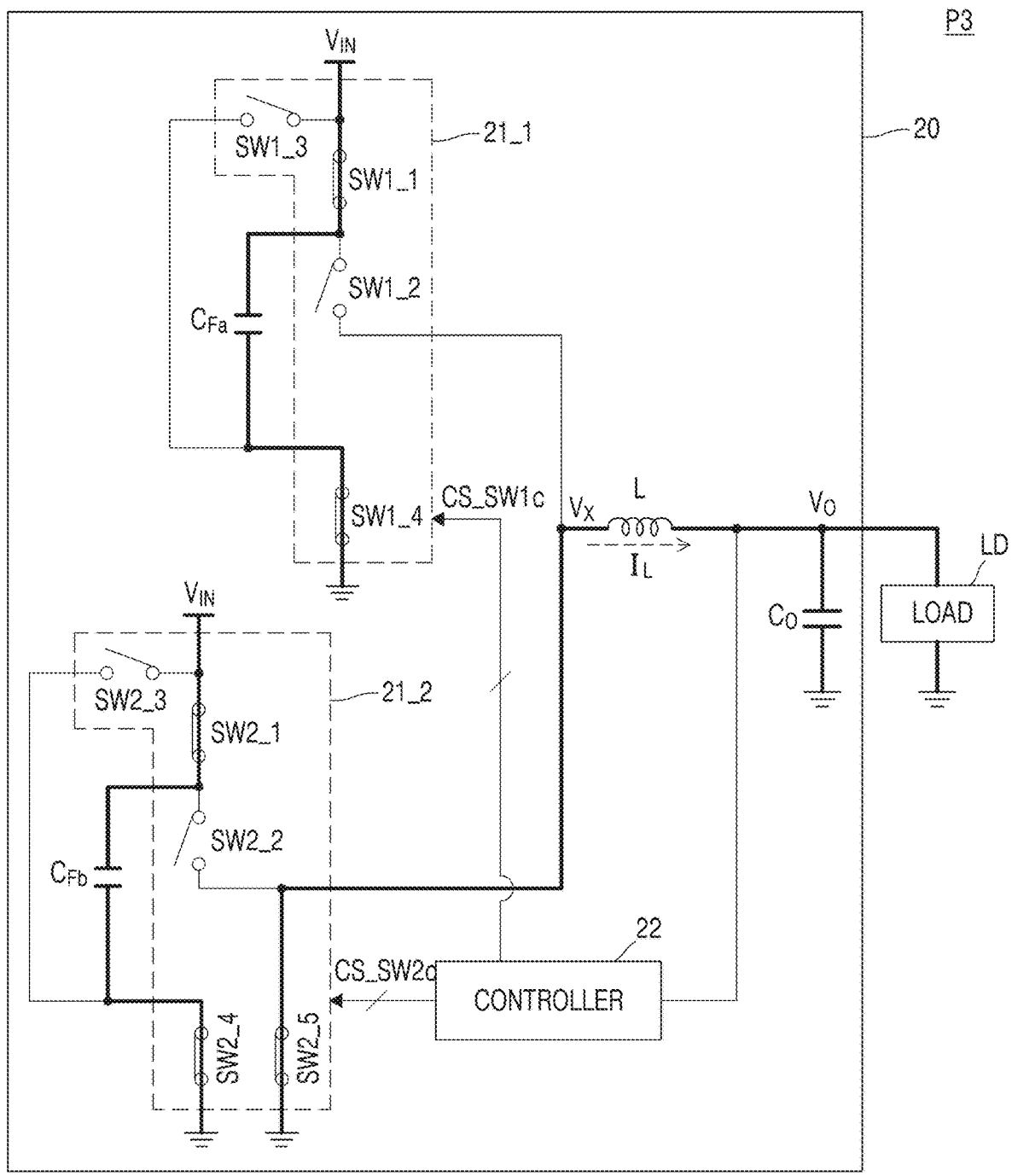
Figure 7D:
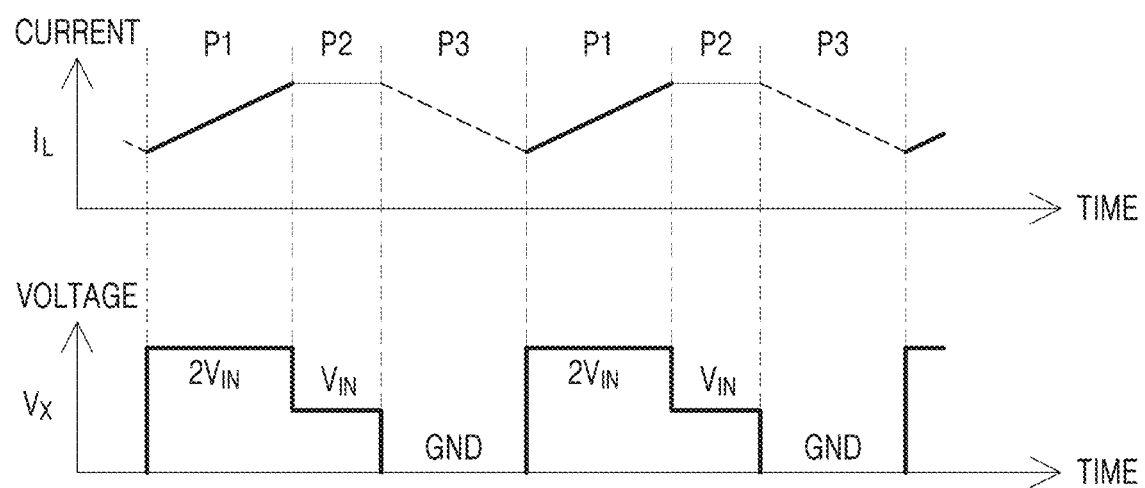
FIG. 7D is a timing chart showing the operation of the switching regulator 20 in the buck-boost mode, in which respective states of FIGS. 7A through 7C are sequentially repeated, according to some example embodiments.

FIGS. 7A through 7C are circuit diagrams of the switching regulator 20, which operates in the buck-boost mode as the second operating mode, according to an example embodiment, and FIG. 7D is a timing chart showing the operation of the switching regulator 20 in the buck-boost mode, in which respective states of FIGS. 7A through 7C are sequentially repeated, according to some example embodiments. FIG. 7A illustrates the switching regulator 20 in the first phase P1, FIG. 7B illustrates the switching regulator 20 in the second phase P2, and FIG. 7C illustrates the switching regulator 20 in the third phase P3. In FIGS. 7A through 7C, paths through which current flows and switches in an on-state are illustrated in bold.

Referring to FIG. 7A, in the buck-boost mode, the controller 22 may generate the first switching control signal CS_SW1$a$ and the second switching control signal CS_SW2$a$ in the first phase P1 such that the second and third switches SW1_2 and SW1_3 of the first switch circuit 21_1 and the sixth and seventh switches SW2_2 and SW2_3 of the second switch circuit 21_2 are turned on and the other switches, e.g., the first, fourth, fifth, eighth, and ninth switches SW1_1, SW1_4, SW2_1, SW2_4, and SW2_5, are turned off.

Both ends of each of the first and second flying capacitors CFa and CFb may be respectively connected to the input node and the inductor L. The applied voltage VX boosted by the first and second flying capacitors CFa and CFb may be provided to the inductor L through the second switch SW1_2 and the sixth switch SW2_2, which are in the on-state. The inductor current IL may flow from the input node to the output capacitor CO and the load LD through the first switch circuit 21_1 and the second switch circuit 21_2. Accordingly, as shown in FIG. 7D, the inductor current IL may gradually increase in the first phase P1, and the applied voltage VX provided to the inductor L may be equal to or similar to a boosted voltage, e.g., a voltage which is about twice the input voltage VIN.

Referring to FIG. 7B, in the buck-boost mode, the controller 22 may generate the first switching control signal CS_SW1$b$ and the second switching control signal CS_SW2$b$ in the second phase P2 such that the first, second, and fourth switches SW1_1, SW1_2, and SW1_4 of the first switch circuit 21_1 and the fifth, sixth, and eighth switches SW2_1, SW2_2, and SW2_4 of the second switch circuit 21_2 are turned on and the other switches, e.g., the third, seventh, and ninth switches SW1_3, SW2_3, and SW2_5, are turned off.

Both ends of each of the first and second flying capacitors CFa and CFb may be respectively connected to the input node and the ground node, and the first and second flying capacitors CFa and CFb may be charged with the input voltage VIN. The inductor current IL may flow from the input node to the output capacitor CO and the load LD through the first switch circuit 21_1 and the second switch circuit 21_2. Accordingly, as shown in FIG. 7D, the inductor current IL may be substantially maintained constant in the second phase P2, and the applied voltage VX may be equal to or similar to the input voltage VIN.

Referring to FIG. 7C, in the buck-boost mode, the controller 22 may generate the first switching control signal CS_SW1$c$ and the second switching control signal CS_SW2$c$ in the third phase P3 such that the first and fourth switches SW1_1 and SW1_4 of the first switch circuit 21_1 and the fifth, eighth, and ninth switches SW2_1, SW2_4, and SW2_5 of the second switch circuit 21_2 are turned on and the other switches, e.g., the second, third, sixth, and seventh switches SW1_2, SW1_3, SW2_2, and SW2_3, are turned off.

Both ends of each of the first and second flying capacitors CFa and CFb may be respectively connected to the input node and the ground node. The inductor L may be connected to the ground node through the second switch circuit 21_2 and may receive the applied voltage VX corresponding to the ground voltage. Accordingly, as shown in FIG. 7D, the inductor current IL may gradually decrease, and the applied voltage VX may be equal to or similar to the ground voltage.

As described above, the controller 22 may identically or similarly control the connection relationship of the first flying capacitor CFa and the connection relationship of the second flying capacitor CFb in one phase during the buck mode and may generate the output voltage VO that is lower than the input voltage VIN.

Figure 8A:
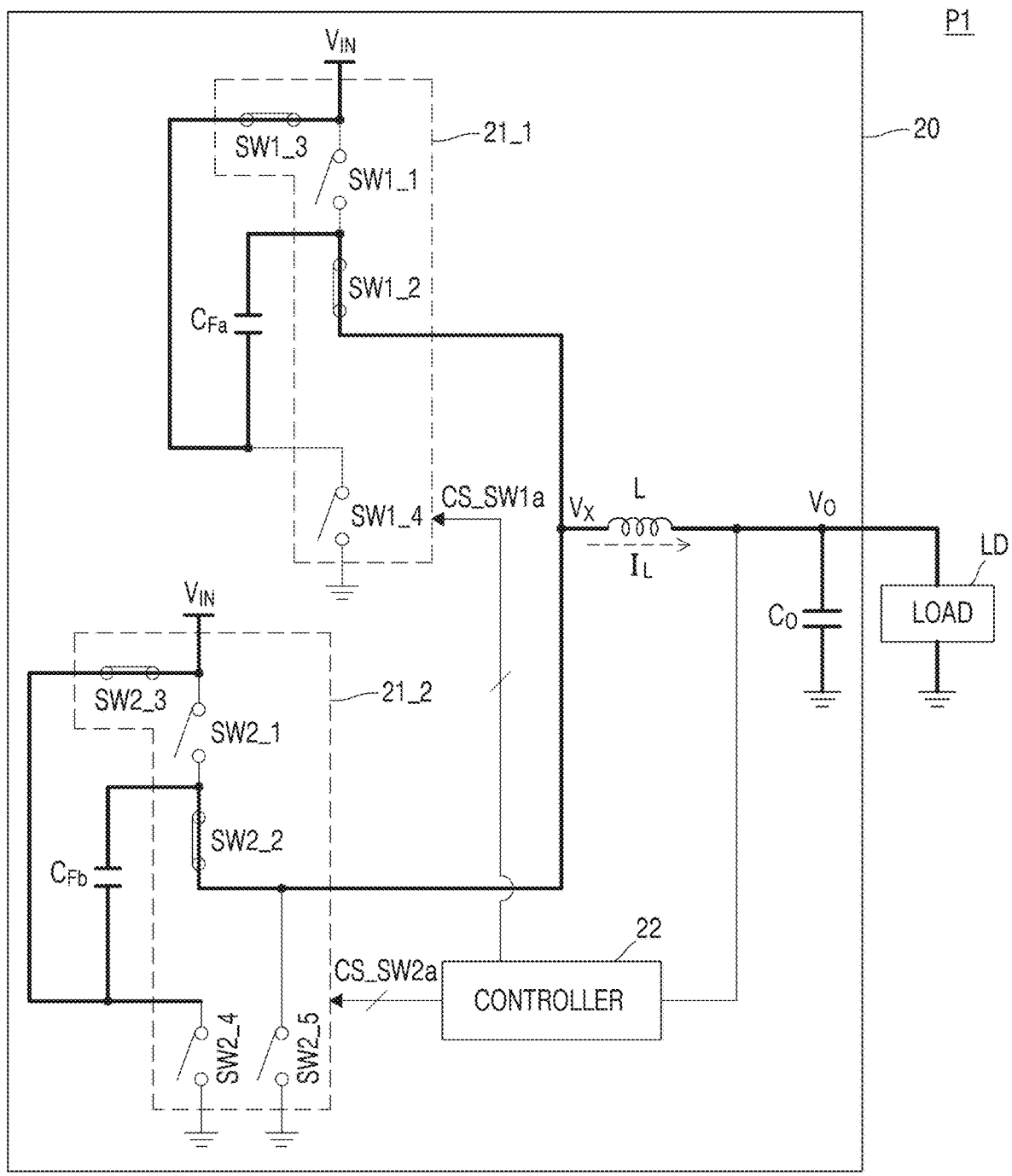
FIGS. 8A and 8B are circuit diagrams of the switching regulator 20, which operates in a first boost mode as a second operating mode, according to an example embodiment.
Figure 8B:
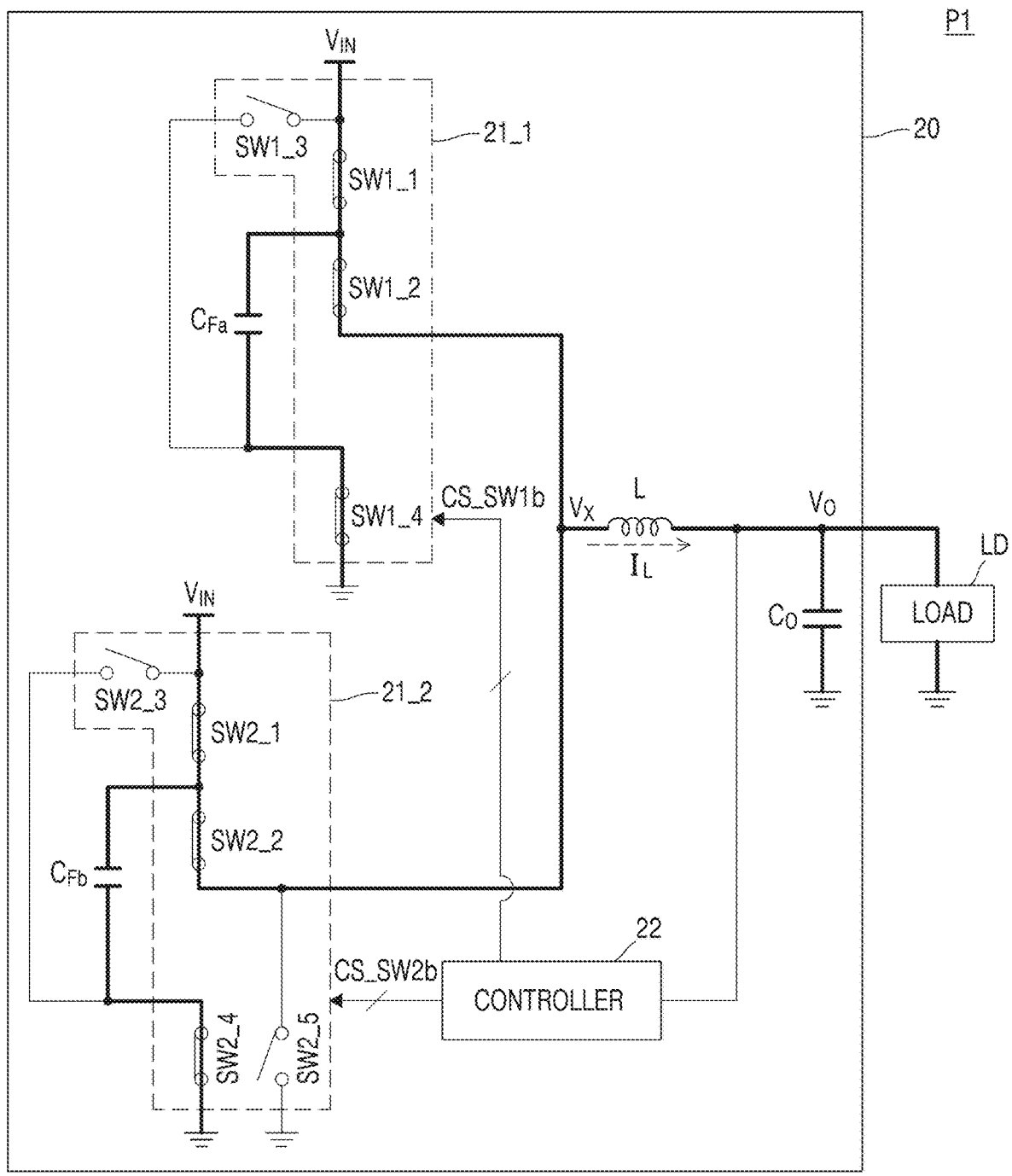
Figure 8C:
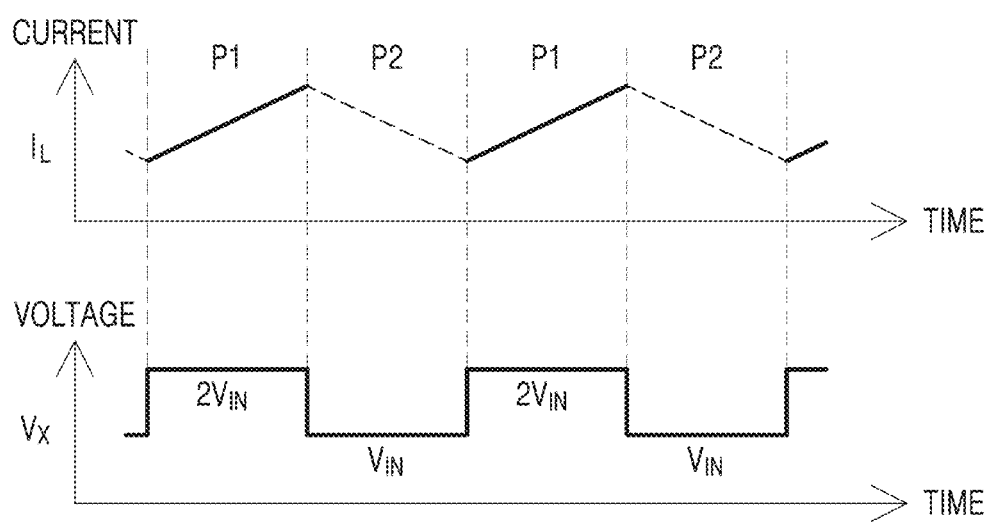
FIG. 8C is a timing chart showing the operation of the switching regulator 20 of FIGS. 8A and 8B, according to some example embodiments.

FIGS. 8A and 8B are circuit diagrams of the switching regulator 20, which operates in the first boost mode as the second operating mode, according to an example embodiment, and FIG. 8C is a timing chart showing the operation of the switching regulator 20 of FIGS. 8A and 8B, according to some example embodiments. FIG. 8A illustrates the switching regulator 20 in the first phase P1, and FIG. 8B illustrates the switching regulator 20 in the second phase P2. In FIGS. 8A and 8B, paths through which current flows and switches in an on-state are illustrated in bold.

Referring to FIG. 8A, in the first boost mode, the controller 22 may generate the first switching control signal CS_SW1a and the second switching control signal CS_SW2a in the first phase P1 such that the second and third switches SW1_2 and SW1_3 of the first switch circuit 21_1 and the sixth and seventh switches SW2_2 and SW2_3 of the second switch circuit 21_2 are turned on and the other switches, e.g., the first, fourth, fifth, eighth, and ninth switches SW1_1, SW1_4, SW2_1, SW2_4, and SW2_5, are turned off.

Both ends of each of the first and second flying capacitors CFa and CFb may be respectively connected to the input node and the inductor L. The applied voltage VX boosted by the first and second flying capacitors CFa and CFb may be provided to the inductor L through the second switch SW1_2 and the sixth switch SW2_2, which are in the on-state. The inductor current IL may flow from the input node to the output capacitor CO and the load LD through the first switch circuit 21_1 and the second switch circuit 21_2. Accordingly, as shown in FIG. 8C, the inductor current IL may gradually increase in the first phase P1, and the applied voltage VX provided to the inductor L may be equal to or similar to a boosted voltage, e.g., a voltage which is about twice the input voltage VIN.

Referring to FIG. 8B, in the first boost mode, the controller 22 may generate the first switching control signal CS_SW1b and the second switching control signal CS_SW2b in the second phase P2 such that the first, second, and fourth switches SW1_1, SW1_2, and SW1_4 of the first switch circuit 21_1 and the fifth, sixth, and eighth switches SW2_1, SW2_2, and SW2_4 of the second switch circuit 21_2 are turned on and the other switches, e.g., the third, seventh, and ninth switches SW1_3, SW2_3, and SW2_5, are turned off.

Both ends of each of the first and second flying capacitors CFa and CFb may be respectively connected to the input node and the ground node, and the first and second flying capacitors CFa and CFb may be charged with the input voltage VIN. The inductor current IL may flow from the input node to the output capacitor CO and the load LD through the first switch circuit 21_1 and the second switch circuit 21_2. Accordingly, as shown in FIG. 8C, the inductor current IL may gradually decrease in the second phase P2, and the applied voltage VX may be equal or similar to the input voltage VIN.

As described above with reference to FIGS. 6A through 8C, the controller 22 may control the first switch circuit 21_1 and the second switch circuit 21_2 based on the synchronous switch control scheme such that the connection structure of the first flying capacitor CFa is the same as or similar to that of the second flying capacitor CFb in one phase.

Although FIGS. 5E, 6C, 7D, and 8C illustrate that phases have the same period or similar periods in one switching cycle, it is just for convenience of illustration. The phases may have different periods from each other. For example, a period of each of the first and third phases P1 and P3 in FIG. 5E may be longer than that of the first phase P1 in FIG. 8C. Accordingly, a period of each of the second and fourth phases P2 and P4 in FIG. 5E may be shorter than that of the second phase P2 in FIG. 8C. In other words, the period of each of the first and third phases P1 and P3 in FIG. 5E (or the period of the first phase P1 in FIG. 8C) may be in proportion to a duty ratio, and the controller 22 may control the first switch circuit 21_1 and the second switch circuit 21_2 based on a greater duty ratio in the second boost mode than in the first boost mode.

Figure 9:
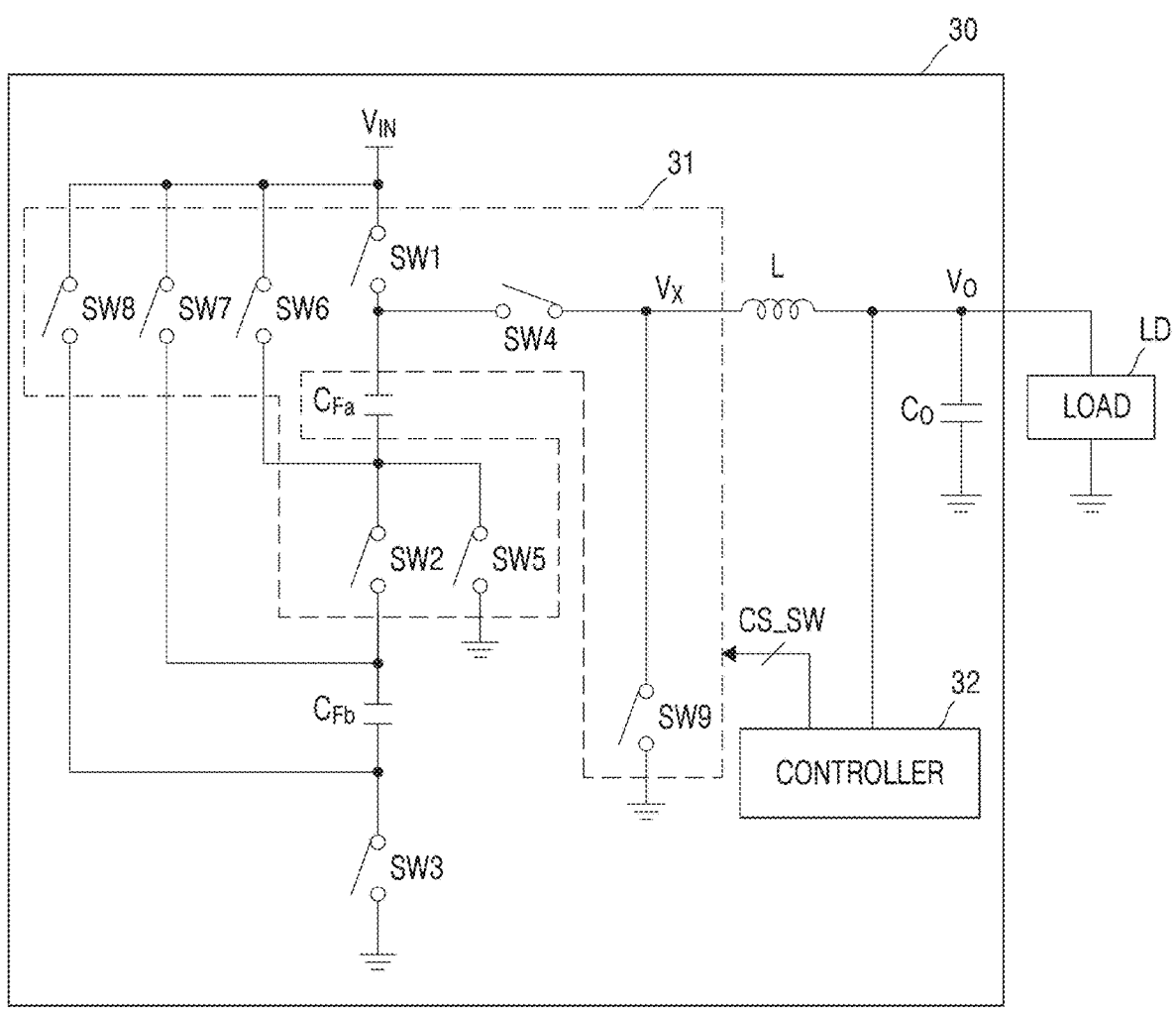
FIG. 9 is a circuit diagram of a switching regulator 30 including a single switch circuit according to an example embodiment.

FIG. 9 is a circuit diagram of a switching regulator 30 according to an example embodiment.

Referring to FIG. 9, the switching regulator 30 may include a switch circuit 31, a controller 32, the first flying capacitor CFa, the second flying capacitor CFb, the inductor L, and/or the output capacitor CO. The load LD may be connected to the switching regulator 30. A first switch SW1 of the switch circuit 31 may correspond to the connecting switch CSW in FIG. 1.

The switch circuit 31 may include first through ninth switches SW1 through SW9. The first and fourth switches SW1 and SW4 may be sequentially connected in series between an input node and the inductor L, and an end of each of the sixth through eighth switches SW6 through SW8 may be connected to the input node. An opposite end of the sixth switch SW6 may be connected to an end of the first flying capacitor CFa. An opposite end of the seventh switch SW7 may be connected to an end of the second flying capacitor CFb. An opposite end of the eighth switch SW8 may be connected to an opposite end of the second flying capacitor CFb. The third switch SW3 may be connected between the opposite end of the second flying capacitor CFb and a ground node. The second switch SW2 may be connected between the end of the first flying capacitor CFa and the end of the second flying capacitor CFb. The fifth switch SW5 may be connected between the end of the first flying capacitor CFa and the ground node. The ninth switch SW9 may be connected between an end of the inductor L and the ground node. As described below, the controller 32 may generate the switching control signal CS_SW such that the first flying capacitor CFa, the second flying capacitor CFb, and the switch circuit 31 operate as a charge pump. The controller 32 may generate the switching control signal CS_SW such that the applied voltage VX boosted by the charge pump is applied to the inductor L. According to some example embodiments, operations described herein as being performed by the controller 32 may be performed by processing circuitry. According to some example embodiments, operations described herein as being performed by the switching regulator 30 may be performed based on control signals generated by the controller 32.

In an embodiment, the controller 32 may generate the switching control signal CS_SW such that the applied voltage VX boosted to be three times the input voltage VIN using the first and second flying capacitors CFa and CFb is applied to the inductor L. However, this is just an example embodiment, and the inventive concepts are not limited thereto. The switching regulator 30 may have a structure that includes more flying capacitors and switches and allows the boosted voltage, e.g., the applied voltage VX, which is N times the input voltage VIN, to be applied to the inductor L, wherein N is an integer that is equal to or greater than 4. Hereinafter, descriptions will be focused on the case where the switching regulator 30 operates in the second boost mode, but it will be understood that the switching regulator 30 may operate in various modes.

Figure 10A:
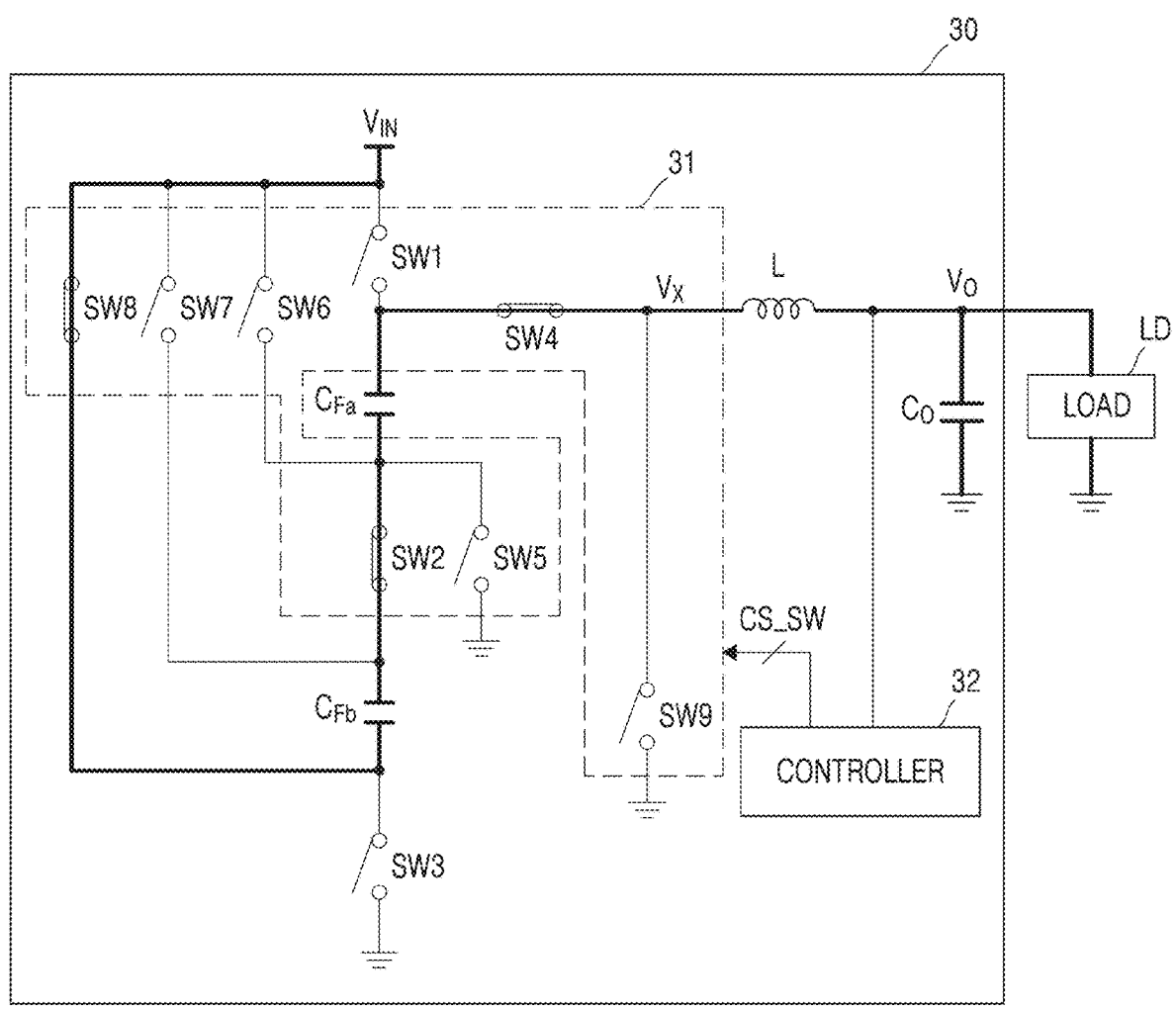
FIGS. 10A and 10B are circuit diagrams of the switching regulator 30 including the single switch circuit, which operates in a second boost mode, according to an example embodiment.
Figure 10B:
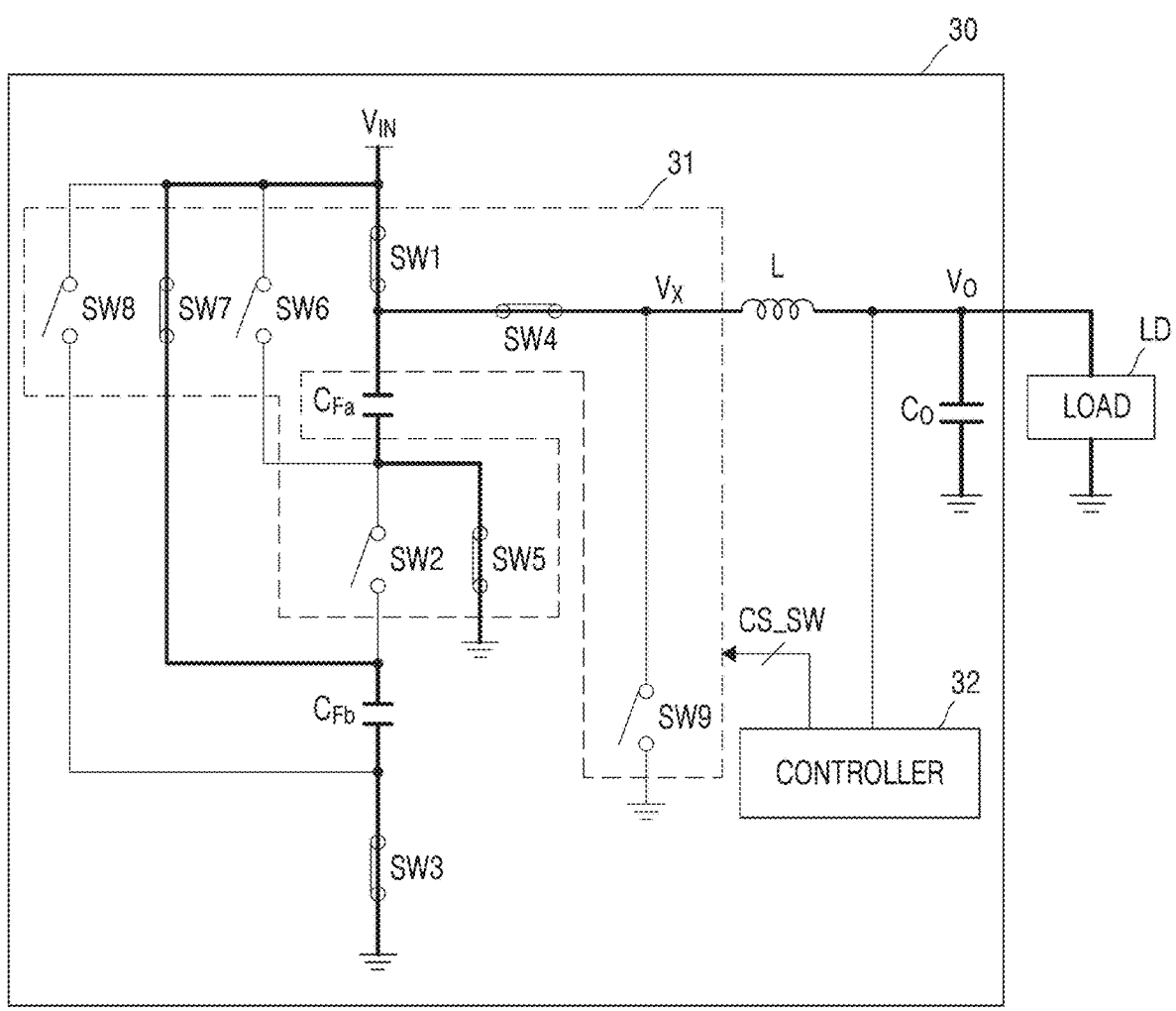
Figure 10C:
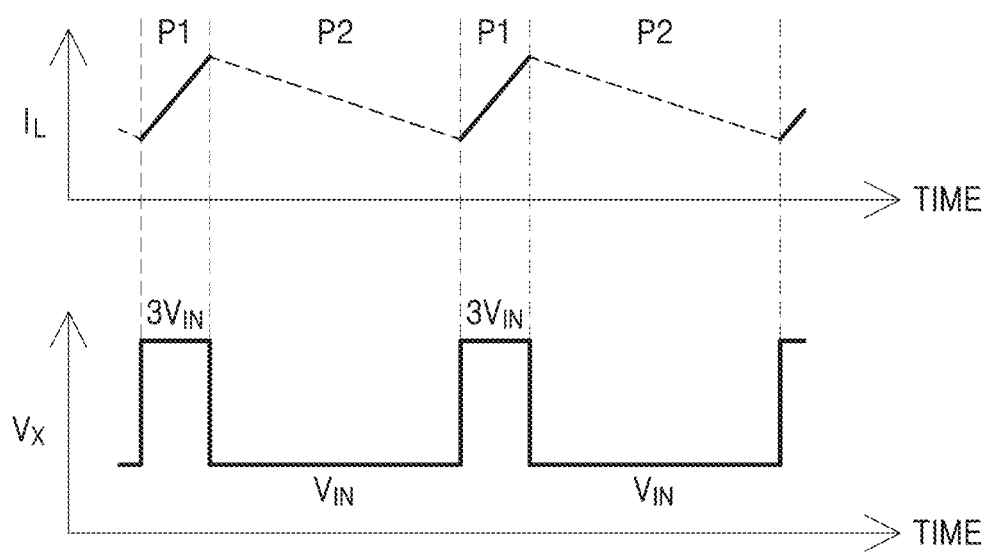
FIG. 10C is a timing chart showing the operation of the switching regulator 30 including the single switch circuit of FIGS. 10A and 10B, according to some example embodiments.

FIGS. 10A and 10B are circuit diagrams of the switching regulator 30, which operates in the second boost mode, according to an example embodiment, and FIG. 10C is a timing chart showing the operation of the switching regulator 30 of FIGS. 10A and 10B, according to some example embodiments. FIG. 10A illustrates the switching regulator 30 in the first phase P1, and FIG. 10B illustrates the switching regulator 30 in the second phase P2. In FIGS. 10A and 10B, paths through which current flows and switches in an on-state are illustrated in bold.

Referring to FIG. 10A, in the second boost mode, the controller 32 may generate a switching control signal CS_SWa in the first phase P1 such that the second, fourth, and eighth switches SW2, SW4, and SW8 of the switch circuit 31 are turned on and the other switches, e.g., the first, third, fifth, sixth, seventh, and ninth switches SW1, SW3, SW5, SW6, SW7, and SW9, are turned off.

The second flying capacitor CFb and the first flying capacitor CFa may be sequentially connected in series between the input node and the inductor L. The applied voltage VX boosted by the first flying capacitor CFa and the second flying capacitor CFb may be provided to the inductor L through the second, fourth, and eighth switches SW2, SW4, and SW8, which are in the on-state. The inductor current IL may flow from the input node to the output capacitor CO and the load LD through the switch circuit 31. Accordingly, as shown in FIG. 10C, the inductor current IL may gradually increase in the first phase P1, and the applied voltage VX provided to the inductor L may be equal to or similar to a boosted voltage, e.g., a voltage which is about three times the input voltage VIN.

Referring to FIG. 10B, in the second boost mode, the controller 32 may generate a switching control signal CS_SWb in the second phase P2 such that the first, third, fourth, fifth, and seventh switches SW1, SW3, SW4, SW5, and SW7 of the switch circuit 31 are turned on and the other switches, e.g., the second, sixth, eighth, and ninth switches SW2, SW6, SW8, and SW9, are turned off.

Both ends of each of the first and second flying capacitors CFa and CFb may be respectively connected to the input node and the ground node, and the first and second flying capacitors CFa and CFb may be charged with the input voltage VIN. The inductor current IL may flow from the input node to the output capacitor CO and the load LD through the switch circuit 31. Accordingly, as shown in FIG. 10C, the inductor current IL may gradually decrease, and the applied voltage VX may be equal to or similar to the input voltage VIN.

As described above with reference to FIG. 10A, the applied voltage VX that is three times the input voltage VIN may be provided to the inductor L in the first phase P1, and accordingly, a period of the first phase P1 may be reduced. In other words, as the level of the applied voltage VX provided to the inductor L in the first phase P1 increases, the period of the first phase P1 may decrease. For example, the period of the first phase P1 in FIG. 10C may be shorter than that of each of the first and third phases P1 and P3 in FIG. 5E. Consequently, the period of the second phase P2 in FIG. 10C may be longer than that of each of the second and fourth phases P2 and P4 in FIG. 5E, and accordingly, a charge time for the first flying capacitor CFa and the second flying capacitor CFb may be sufficiently secured in the second phase P2 of FIG. 10B. As a result, an abnormally excessive current may be prevented from flowing in the first switch SW1 or the occurrence of the abnormally excessive current flowing in the first switch SW1 may be reduced.

Figure 11:
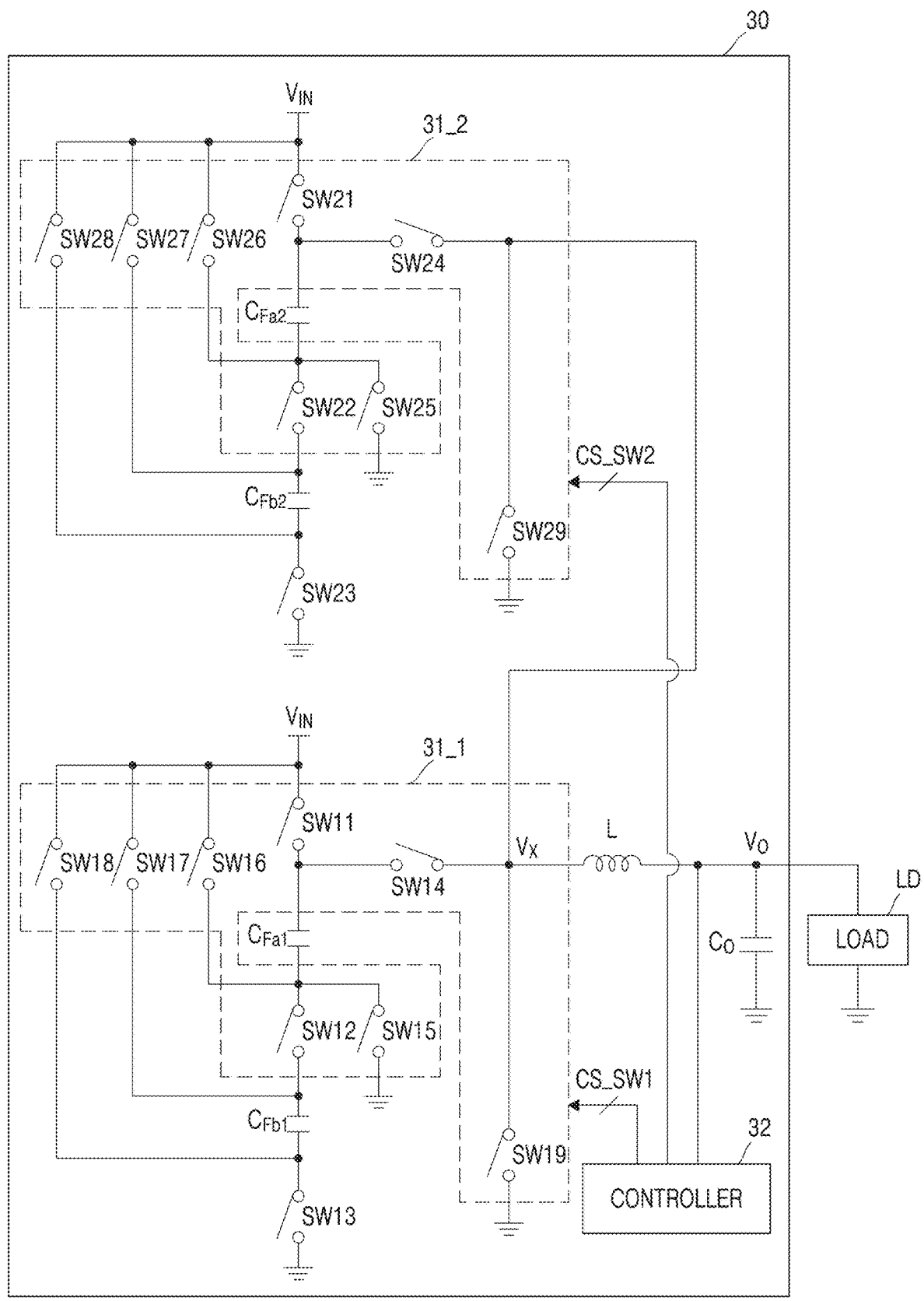
FIG. 11 is a circuit diagram of a switching regulator 30 including two switch circuits according to an example embodiment.

FIG. 11 is a circuit diagram of the switching regulator 30 according to an example embodiment.

Referring to FIG. 11, the switching regulator 30 may include a first switch circuit 31_1, a second switch circuit 31_2, the controller 32, the inductor L, the output capacitor CO, and/or first through fourth flying capacitors CFa1, CFa2, CFb1, and CFb2. The load LD may be connected to the switching regulator 30. A first switch SW11 of the first switch circuit 31_1 and a tenth switch SW21 of the second switch circuit 31_2 may respectively correspond to the first connecting switch CSW1 and the second connecting switch CSW2 in FIG. 2.

The first switch circuit 31_1 may include first through ninth switches SW11 through SW19 (e.g., SW11, SW12, SW13, SW14, SW15, SW16, SW17, SW18 and SW19) and may be connected to the first flying capacitor CFa1 and the second flying capacitor CFb1. The second switch circuit 31_2 may include tenth through eighteenth switches SW21 through SW29 (e.g., SW21, SW22, SW23, SW24, SW25, SW26, SW27, SW28 and SW29) and may be connected to the third flying capacitor CFa2 and the fourth flying capacitor CFb2. The structure of the first switch circuit 31_1 and the second switch circuit 31_2 are the same as or similar to that of the switch circuit 31, which has been described in detail with reference to FIG. 9, and therefore, redundant descriptions will be omitted.

The controller 32 may control the first switch circuit 31_1 and the second switch circuit 31_2 using different switch control schemes according to the operating modes of the switching regulator 30. In an embodiment, the controller 32 may control the first switch circuit 31_1 and the second switch circuit 31_2 based on the interleaving switch control scheme in the first operating mode such that the first through fourth flying capacitors CFa1, CFa2, CFb1, and CFb2 are alternately charged and connected to the inductor L in different phases. The controller 32 may identically or similarly control the first switch circuit 31_1 and the second switch circuit 31_2 based on the synchronous switch control scheme in the second operating mode. Since the detailed descriptions thereof have been given with respect to drawings including FIG. 4, redundant descriptions will be omitted.

FIG. 12 is a table of conditions for setting an operating mode of a switching regulator, according to an example embodiment. Hereinafter, it is assumed that "a" is 0.1 and "b" is 0.5 for clarification. However, it is just an example for explanation, and "a" and "b" are not limited thereto and may be set variously.

Referring to FIG. 12, the switching regulator may be set in the buck mode when the target level of the output voltage VO is less than (1−a) times the input voltage VIN. The switching regulator may be set in the buck-boost mode when the target level of the output voltage VO is equal to or greater than (1−a) times the input voltage VIN and less than (1+a) times the input voltage VIN. The switching regulator may be set in the first boost mode when the target level of the output voltage VO is equal to or greater than (1+a) times the input voltage VIN and less than (1+b) times the input voltage VIN. The switching regulator may be set in the second boost mode when the target level of the output voltage VO is equal to or greater than (1+b) times the input voltage VIN.

In an embodiment, when the switching regulator is set in the second boost mode, switches of the switching regulator may be controlled based on the interleaving switch control scheme. When the switching regulator is set in the first boost mode, the buck mode, or the buck-boost mode, the switches of the switching regulator may be controlled based on the synchronous switch control scheme. However, this is just an example embodiment, and the inventive concepts are not limited thereto. When the switching regulators set in the first boost mode, the switches of the switching regulator may be controlled based on the interleaving switch control scheme. Furthermore, the switching regulator may be set in more various operating modes, and various switch control schemes may be used to reduce a current load on a connecting switch according to the operating modes.

Figure 13:
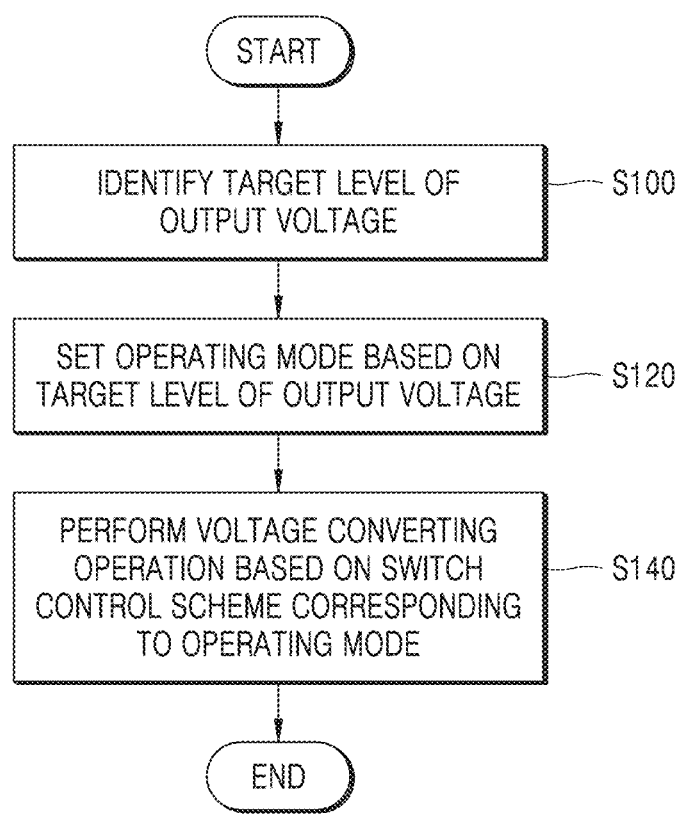
FIG. 13 is a flowchart of a method of operating a switching regulator, according to an example embodiment.

FIG. 13 is a flowchart of a method of operating a switching regulator, according to an example embodiment.

Referring to FIG. 13, the switching regulator may identify a target level of an output voltage in operation S100. An operating mode of the switching regulator may be set based on the target level of the output voltage in operation S120. The switching regulator may generate the output voltage by performing a voltage converting operation based on a switch control scheme corresponding to the operating mode in operation S130.

Figure 14:
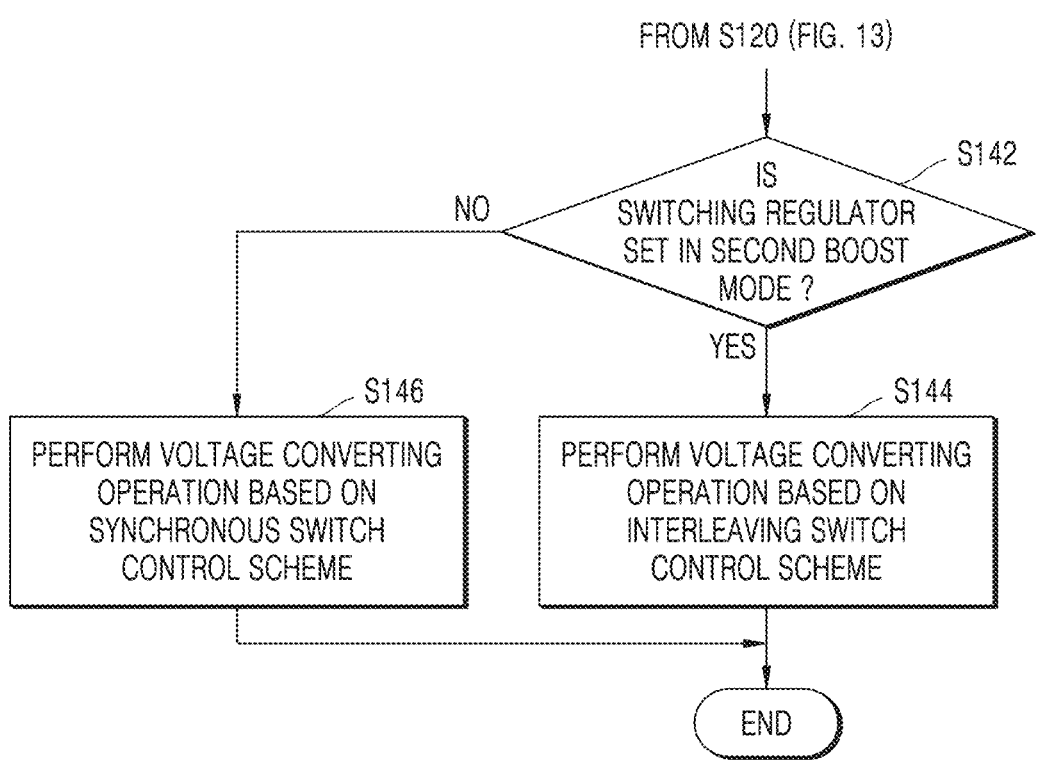
FIG. 14 is a detailed flowchart of operation S130 in FIG. 13, according to an example embodiment.

FIG. 14 is a detailed flowchart of operation S140 in FIG. 13, according to an example embodiment.

Referring to FIG. 14, after operation S120 (FIG. 13), the switching regulator may check whether the switching regulator is set in a second boost mode in operation S142. When the switching regulator is in the second boost mode (e.g., in the case of YES) in operation S142, the switching regulator may perform the voltage converting operation based on an interleaving switch control scheme in operation S144. When the switching regulator is not in the second boost mode (e.g., in the case of NO) in operation S142, the switching regulator may perform the voltage converting operation based on a synchronous switch control scheme in operation S146.

Figure 15:
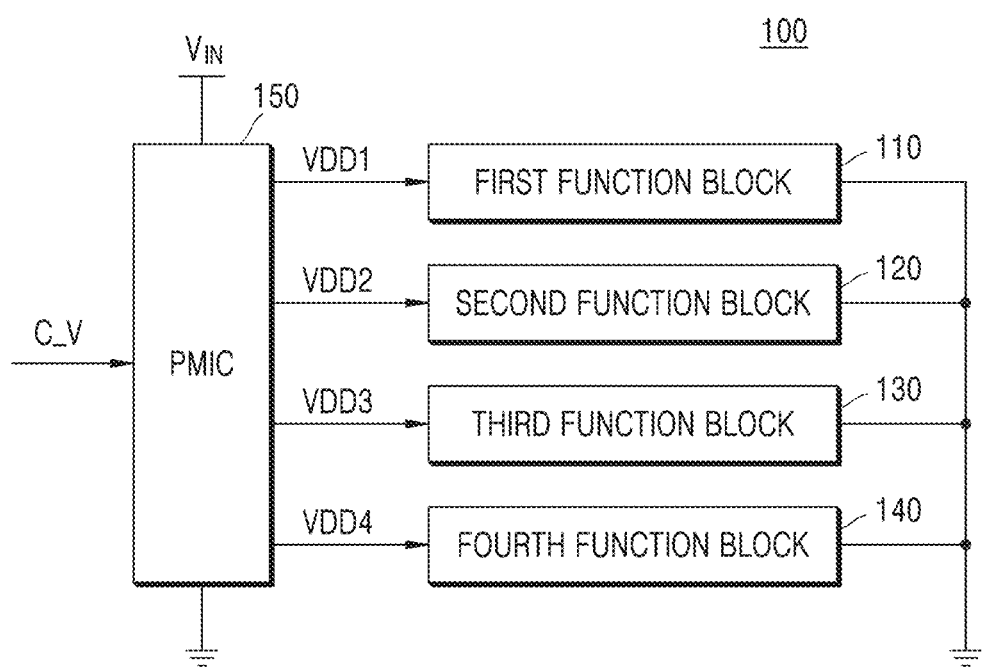
FIG. 15 is a diagram of a system according to an example embodiment.

FIG. 15 is a diagram of a system 100 according to an example embodiment. The system 100 may be implemented as a single semiconductor integrated circuit like a system-on-chip (SoC) in some embodiments or may include a printed circuit board (PCB) and packages mounted on the PCB in some embodiments. As shown in FIG. 15, the system 100 may include first through fourth function blocks 110 through 140 (e.g., first function block 110, second function block 120, third function block 130 and fourth function block 140) and/or a power management integrated circuit (PMIC) 150.

Each of the first through fourth function blocks 110 through 140 may operate based on power provided from a corresponding one of first through fourth supply voltages VDD1 through VDD4 (e.g., VDD1, VDD2, VDD3 and VDD4) output from the PMIC 150. For example, at least one of the first through fourth function blocks 110 through 140 may include a digital circuit that processes digital signals like an application processor (AP) or an analog circuit that processes analog signals like an amplifier. At least one of the first through fourth function blocks 110 through 140 may include a circuit that processes mixed signals like an analog-to-digital converter (ADC). Although the system 100 includes four function blocks in FIG. 15, the system 100 may include fewer or more function blocks in some embodiments.

The PMIC 150 may generate the first through fourth supply voltages VDD1 through VDD4 from the input voltage VIN and change the level of at least one of the first through fourth supply voltages VDD1 through VDD4 in response to a voltage control signal C_V. At least one of the first through fourth function blocks 110 through 140 may receive a supply voltage having a level, which dynamically varies with the performance and power consumption of the at least one of the first through fourth function blocks 110 through 140. For example, the first function block 110 may include an image processor that processes image data. The first function block 110 may receive the first supply voltage VDD1 having a high level while processing a video including a series of images. The first function block 110 may receive the first supply voltage VDD1 having a low level while processing a photograph including a single image. The PMIC 150 may receive the voltage control signal C_V corresponding to the performance and power consumption of the first function block 110 and may increase or decrease the level of the first supply voltage VDD1 based on the voltage control signal C_V. As described above, a method of dynamically changing the level of a supply voltage for a function block may be referred to as dynamic voltage scaling.

The PMIC 150 may include any switching regulator that has been described above with reference to the drawings (e.g., the switching regulator 10, the switching regulator 20 and/or the switching regulator 30). According to some example embodiments, the PMIC 150 may generate the first through fourth supply voltages VDD1 through VDD4 from the input voltage VIN and change the level of at least one of the first through fourth supply voltages VDD1 through VDD4 in response to a voltage control signal C_V using the switching regulator. Accordingly, when the first supply voltage VDD1 is maintained at a certain level, the first supply voltage VDD1 may have reduced noise. Due to the reduce noise in the first supply voltage VDD1, the operational reliability of the first function block 110 and the system 100 may be increased. In addition, the level of the first supply voltage VDD1 may be quickly changed. In some embodiments, the first function block 110 may stop operating while the level of the first supply voltage VDD1 is being changed and may restart to operate after the level of the first supply voltage VDD1 is changed. Accordingly, when the level of the first supply voltage VDD1 is quickly changed, an operating time of the first function block 110 may be reduced. As a result, the system 100 may provide improved performance. In addition, the PMIC 150 may include elements (e.g., connecting switches) having a reduced size, and therefore, the PMIC 150 may be easily integrated with the first through fourth function blocks 110 through 140 in a single package.

Figure 16:
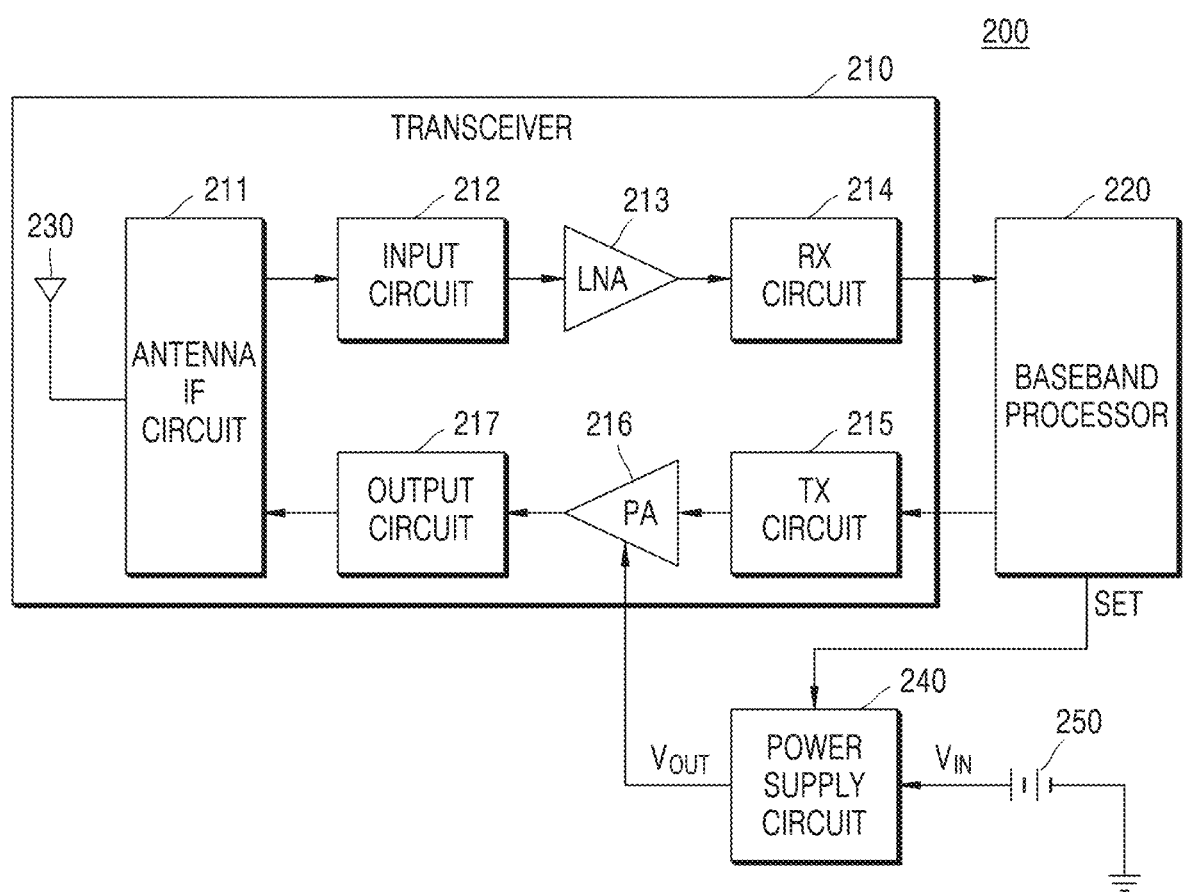
FIG. 16 is a block diagram of a wireless communication device according to an example embodiment.

FIG. 16 is a block diagram of a wireless communication device 200 according to an example embodiment. In detail, FIG. 16 illustrates user equipment (UE) (or a user terminal) supplied with power by a battery 250. In some embodiments, the wireless communication device 200 may be included in a wireless communication system, such as Fifth Generation (5G) or Long-Term Evolution (LTE), using a cellular network, a wireless local area network (WLAN) system, and/or another wireless communication system. In the wireless communication device 200, a switching regulator according to an example embodiment may be used to supply variable electric power to a power amplifier (PA) 216. As shown in FIG. 16, the wireless communication device 200 may include a transceiver 210, a baseband processor 220, an antenna 230, a power supply circuit 240, and/or the battery 250.

The transceiver 210 may include an antenna interface (IF) circuit 211, a receiver, and/or a transmitter. The receiver may include an input circuit 212, a low-noise amplifier (LNA) 213, and/or a receiver (RX) circuit 214. The transmitter may include a transmitter (TX) circuit 215, the PA 216, and/or an output circuit 217. The antenna IF circuit 211 may connect the transmitter and/or the receiver to the antenna 230 according to a TX mode and/or an RX mode. In some embodiments, the input circuit 212 may include a matching circuit or a filter, the LNA 213 may amplify an output signal of the input circuit 212, and/or the RX circuit 214 may include a mixer for down-conversion. In some embodiments, the TX circuit 215 may include a mixer for up-conversion, the PA 216 may amplify an output signal of the TX circuit 215, and/or the output circuit 217 may include a matching circuit and/or a filter.

The baseband processor 220 may transmit and/or receive baseband signals to and from the transceiver 210 and may perform modulation, demodulation, encoding, and/or decoding. In some embodiments, the baseband processor 220 may be referred to as a modem. The baseband processor 220 may generate a setting signal SET for setting an average power tracking mode and/or an envelope tracking mode and/or for changing the level of the output voltage VO.

The power supply circuit 240 may receive the input voltage VIN from the battery 250 and generate the output voltage VO that provides power to the PA 216. The power supply circuit 240 may include any switching regulator that has been described above with reference to the drawings (e.g., the switching regulator 10, the switching regulator 20 and/or the switching regulator 30) and may enable the level of the output voltage VO to be quickly changed and to be stable. According to some example embodiments, the power supply circuit 240 generates the output voltage VO from the input voltage VIN, and enables the level of the output voltage VO to be quickly changed and to be stable, using the switching regulator.

While the inventive concepts have been particularly shown and described with reference to embodiments thereof, it will be understood that various changes in form and details may be made therein without departing from the spirit and scope of the following claims.

What is claimed is:

1. A switching regulator configured to generate a level-controlled output voltage from an input voltage, the switching regulator comprising:
   an input node configured to receive the input voltage;
   an output node configured to output the level-controlled output voltage;
   an inductor having one end connected to the output node;
   an output capacitor configured to generate the level-controlled output voltage based on a current flowing through the inductor;
   a first switch circuit including a plurality of first switches and a first flying capacitor and connected to the input node and the other end of the inductor;
   a second switch circuit including a plurality of second switches and a second flying capacitor and connected to the input node and the other end of the inductor; and
   a controller configured to control a switching operation of the first and second switch circuits based on a selected one of a plurality of operation modes,
   wherein the controller controls the first and second flying capacitors to be synchronously charged in at least one phase or charged in an interleaving manner in a plurality of phases, based on the selected mode and a target level of the level-controlled output voltage.

2. The switching regulator of claim 1, wherein, when the selected mode is a buck mode, the controller controls the first and second flying capacitors to be synchronously charged and the input voltage to be applied to the other end of the inductor through the first and second switch circuits, in a first phase, and controls the first and second flying capacitors to be synchronously charged, a connection between the first switch circuit and the other end of the inductor to be disconnected, and the other end of the inductor to be grounded through the second switch circuit, in a second phase.

3. The switching regulator of claim 1, wherein, when the selected mode is a buck-boost mode, the controller controls the input voltage to be boosted through the first and second flying capacitors and applied to the other end of the inductor, in a first phase, controls the first and second flying capacitors to be synchronously charged and the input voltage to be applied to the other end of the inductor through the first and second switch circuits, in a second phase, and controls the first and second flying capacitors to be synchronously charged, a connection between the first switch circuit and the other end of the inductor to be disconnected, and the other end of the inductor to be grounded through the second switch circuit, in a third phase.

4. The switching regulator of claim 1, wherein, when the selected mode is a boost mode and the target level is less than a reference level, the controller controls the input voltage to be boosted through the first and second flying capacitors and applied to the other end of the inductor, in a first phase, and controls the first and second flying capacitors to be synchronously charged and the input voltage to be applied to the other end of the inductor through the first and second switch circuits, in a second phase.

5. The switching regulator of claim 1, wherein, when the selected mode is a boost mode, the controller controls the first and second flying capacitors to be synchronously charged when the target level is less than a reference level, and controls the first and second flying capacitors to be charged in an interleaving manner when the target level is greater than or equal to the reference level.

6. The switching regulator of claim 1, wherein, when the selected mode is a buck mode or a buck-boost mode, the controller controls the first and second flying capacitors to be synchronously charged.

7. The switching regulator of claim 1, wherein, when the selected mode is a boost mode and the target level is greater than or equal to a reference level, the controller controls the input voltage to be boosted through the first and second flying capacitors and applied to the other end of the inductor, in a first phase, controls the input voltage to be applied to the other end of the inductor through the first switch circuit and controls the second flying capacitor to be charged, in a second phase, controls the first flying capacitor to be charged and the input voltage to be boosted through the second flying capacitor and applied to the other end of the inductor, in a third phase, and controls the first flying capacitor to be charged and the input voltage to be applied to the other end of the inductor through the second switch circuit, in a fourth phase.

8. The switching regulator of claim 7, wherein the controller controls the first flying capacitor to be floated in the second phase and the second flying capacitor to be floated in the fourth phase.

9. A switching regulator configured to generate a level-controlled output voltage from an input voltage, the switching regulator comprising:
an input node configured to receive the input voltage;
an output node configured to output the level-controlled output voltage;
an inductor having one end connected to the output node;
an output capacitor configured to generate the level-controlled output voltage based on a current flowing through the inductor;
a first switch circuit including a first connection switch coupled to the input node, a plurality of first switches, and a first flying capacitor and connected to the input node and the other end of the inductor;
a second switch circuit including a second connection switch coupled to the input node, a plurality of second switches, and a second flying capacitor and connected to the input node and the other end of the inductor; and
a controller configured to control a switching operation of the first and second switch circuits based on a selected one of a plurality of operation modes,
wherein the controller controls first and second current paths and third and fourth current paths to be synchronously formed during at least one phase or formed in an interleaving manner during a plurality of phases, in the first and second connection switches, based on the selected mode and a target level of the level-controlled output voltage, wherein the first and second current paths are for respectively charging the first and second flying capacitors with the input voltage and the third and fourth current paths are for applying the input voltage to the other end of the inductor through the first and second switch circuits.

10. The switching regulator of claim 9, wherein, when the selected mode is a buck mode or a buck-boost mode the controller controls the first and third current paths to be synchronously formed in the first connection switch and controls the second and fourth current paths to be synchronously formed in the second connection switch.

11. The switching regulator of claim 9, wherein, when the selected mode is a boost mode and the target level is less than a reference level, the controller controls the first and third current paths to be synchronously formed in the first connection switch during a certain phase and controls the second and fourth current paths to be synchronously formed in the second connection switch during the certain phase.

12. The switching regulator of claim 9, wherein, when the selected mode is a boost mode and the target level is greater than or equal to a reference level, the controller controls the first and third current paths to be formed in an interleaving manner in the first connection switch and controls the second and fourth current paths to be formed in an interleaving manner in the second connection switch.

13. The switching regulator of claim 9, wherein the controller controls a current less than or equal to a threshold value to flow through the first and second connection switches.

14. The switching regulator of claim 9, wherein, when the selected mode is a buck mode or a buck-boost mode, the controller disables one of the first and second switch circuits.

15. The switching regulator of claim 9, where, when the selected mode is a boost mode and the target level is less than a reference level, the controller disables one of the first and second switch circuits.

16. A switching regulator configured to generate a level-controlled output voltage from an input voltage, the switching regulator comprising:
an input node configured to receive the input voltage;
an output node configured to output the level-controlled output voltage;
an inductor having one end connected to the output node;
an output capacitor configured to generate the level-controlled output voltage based on a current flowing through the inductor;
first and second flying capacitors configured to provide a boosting voltage to one end of the inductor; and
a switch circuit including a plurality of switches and coupled to the first and second flying capacitors, the other end of the inductor, and a ground; and
a controller configured to control a switching operation of the switch circuit based on a selected one of a plurality of operation modes,
wherein, when the selected mode is a boost mode and a target level of the level-controlled output voltage is greater than or equal to a reference level, the controller controls the input voltage to be boosted through the first and second flying capacitors connected in series with each other and to be applied to the other end of the inductor, in a first phase, and controls the first and second flying capacitors to be charged and the input voltage to be applied to the other end of the inductor through the switch circuit, in a second phase.

17. The switching regulator of claim 16, wherein the plurality of switches include first to ninth switches,
wherein one end of the first switch is connected to the input node and the other end of the first switch is connected to one end of the first flying capacitor,
one end of the second switch is connected to the other end of the first flying capacitor and the other end of the second switch is connected to one end of the second flying capacitor,
one end of the third switch is connected to the other end of the second flying capacitor and the other end of the third switch is grounded,
one end of the fourth switch is connected to the one end of the first flying capacitor and the other end of the fourth switch is connected to the other end of the inductor,
one end of the fifth switch is connected to the other end of the first flying capacitor and the other end of the fifth switch is grounded,
one end of the sixth switch is connected to the input node and the other end of the sixth switch is connected to the other end of the first flying capacitor,
one end of the seventh switch is connected to the input node and the other end of the seventh switch is connected to the one end of the second flying capacitor,
one end of the eighth switch is connected to the input node and the other end of the eighth switch is connected to the other end of the second flying capacitor, and
one end of the ninth switch is connected to the other end of the inductor and the other end of the ninth switch is grounded.

18. The switching regulator of claim 17, wherein the controller controls the first, third, fifth, sixth, seventh, and ninth switches to be opened and the second, fourth, and eighth switches to be closed, in the first phase, and controls the second, sixth, eighth, and ninth switches to be opened and the first, third, fourth, fifth, and seventh switches to be closed, in the second phase.

19. The switching regulator of claim 17, wherein the controller controls a period of the second phase to be longer than a period of the first phase.

20. The switching regulator of claim 16, wherein, in the first phase, the input voltage is boosted to have a level exceeding twice an initial level.

\* \* \* \* \*